(12) United States Patent
Galustyan et al.

(10) Patent No.: US 11,043,215 B2
(45) Date of Patent: Jun. 22, 2021

(54) METHOD AND SYSTEM FOR GENERATING TEXTUAL REPRESENTATION OF USER SPOKEN UTTERANCE

(71) Applicant: YANDEX EUROPE AG, Lucerne (CH)

(72) Inventors: Sergey Surenovich Galustyan, p. Sovkhoznyy (RU); Fedor Aleksandrovich Minkin, Moskovskaya obl. (RU)

(73) Assignee: YANDEX EUROPE AG, Lucerne (CH)

( * ) Notice: Subject to any disclaimer, the term of this patent is extended or adjusted under 35 U.S.C. 154(b) by 137 days.

(21) Appl. No.: 16/587,078

(22) Filed: Sep. 30, 2019

(65) Prior Publication Data

US 2020/0312312 A1     Oct. 1, 2020

(30) Foreign Application Priority Data

Mar. 25, 2019    (RU) .......................... RU2019108465

(51) Int. Cl.
*G10L 15/197* (2013.01)
*G10L 15/02* (2006.01)
(Continued)

(52) U.S. Cl.
CPC ............ *G10L 15/197* (2013.01); *G10L 15/02* (2013.01); *G10L 15/063* (2013.01); *G10L 15/22* (2013.01);
(Continued)

(58) Field of Classification Search
CPC ..... G10L 15/197; G10L 15/02; G10L 15/063; G10L 15/22; G10L 25/63; G10L 25/84; G10L 25/90
See application file for complete search history.

(56) References Cited

U.S. PATENT DOCUMENTS 5,040,215 A      8/1991  Amano et al.
6,865,528 B1 *   3/2005  Huang .................. G10L 15/197
                                                      704/257
(Continued)

FOREIGN PATENT DOCUMENTS

RU          2466468 C1      11/2012
RU          2583150 C1       5/2016

OTHER PUBLICATIONS

Search Report with regard to the counterpart RU Patent Application No. RU 2019108465 completed Mar. 26, 2020.
(Continued)

*Primary Examiner* — Paras D Shah
*Assistant Examiner* — Darioush Agahi
(74) *Attorney, Agent, or Firm* — BCF LLP

(57) ABSTRACT

A method and a system for generating textual representation of user spoken utterance is disclosed. The method comprises receiving an indication of the user spoken utterance; generating, at least two hypotheses; generating, by the electronic device, from the at least two hypotheses a set of paired hypotheses, a given one of the set of paired hypotheses including a first hypothesis paired with a second hypothesis; determining, for the given one of the set of paired hypotheses, a pair score; generating a set of utterance features, the set of utterance features being indicative of one or more characteristics associated with the user spoken utterance; ranking, the first hypothesis and the second hypothesis based at least on the pair score and the set of utterance features; and in response to the first hypothesis being a highest ranked hypothesis, selecting the first hypothesis as the textual representation of user spoken utterance.

18 Claims, 7 Drawing Sheets

(51) Int. Cl.
  *G10L 15/22* (2006.01)
  *G10L 25/63* (2013.01)
  *G10L 25/84* (2013.01)
  *G10L 25/90* (2013.01)
  *G10L 15/06* (2013.01)

(52) U.S. Cl.
  CPC .............. *G10L 25/63* (2013.01); *G10L 25/84* (2013.01); *G10L 25/90* (2013.01)

(56) References Cited

U.S. PATENT DOCUMENTS

| | | | |
|---|---|---|---|
| 10,032,463 B1* | 7/2018 | Rastrow | G10L 15/183 |
| 2001/0016815 A1 | 8/2001 | Takahashi et al. | |
| 2013/0191129 A1 | 7/2013 | Kurata et al. | |
| 2015/0228279 A1* | 8/2015 | Biadsy | G10L 15/26 704/235 |
| 2016/0098987 A1 | 4/2016 | Stolcke et al. | |
| 2016/0275946 A1* | 9/2016 | Caseiro | G10L 15/197 |
| 2017/0061956 A1 | 3/2017 | Sarikaya et al. | |
| 2017/0084268 A1* | 3/2017 | Yoo | G10L 15/063 |
| 2017/0178625 A1 | 6/2017 | Mamou et al. | |
| 2017/0193387 A1* | 7/2017 | Lavallee | G06F 16/3329 |
| 2018/0047388 A1 | 2/2018 | Tyagi et al. | |
| 2018/0096678 A1* | 4/2018 | Zhou | G10L 15/32 |
| 2018/0113854 A1* | 4/2018 | Vig | G06F 40/35 |
| 2018/0130460 A1 | 5/2018 | Nagano et al. | |
| 2018/0137857 A1* | 5/2018 | Zhou | G10L 15/32 |

OTHER PUBLICATIONS

Takami et al., "A Pairwise Discriminant Approach using Artificial Neural Networks for Continuous Speech Recognition", Journal of the Acoustical Society of Japan, Feb. 1992, vol. 13, No. 6, pp. 411-418.

Zahorian et al., "A Partitioned Neural Network Approach for Vowel Classification using Smoothed Time/Frequency Features", Institute of Electrical and Electronics Engineers, Jul. 1999, vol. 7, No. 4, 7 pages.

Kulkarni et al., "Hyperarticulation Detection in Repetitive Voice Queries using Pairwise Comparison for Improved Speech Recognition", Institute of Electrical and Electronics Engineers, Jun. 2017, pp. 4985-4989.

* cited by examiner

METHOD AND SYSTEM FOR GENERATING TEXTUAL REPRESENTATION OF USER SPOKEN UTTERANCE

CROSS-REFERENCE

The present application claims priority to Russian Patent Application No. 2019108465, filed Mar. 25, 2019, entitled "METHOD AND SYSTEM FOR GENERATING TEXTUAL REPRESENTATION OF USER SPOKEN UTTERANCE", the entirety of which is incorporated herein.

FIELD

The present technology relates to natural language processing in general and specifically to a method and a system for generating a textual representation of a user spoken utterance.

BACKGROUND

Electronic devices, such as smartphones and tablets, are able to access an increasing and diverse number of applications and services for processing and/or accessing different types of information. However, novice users and/or impaired users and/or users operating a vehicle may not be able to effectively interface with such devices mainly due to the variety of functions provided by these devices or the inability to use the machine-user interfaces provided by such devices (such as a key board). For example, a user who is driving or a user who is visually-impaired may not be able to use the touch screen key board associated with some of these devices.

Virtual assistant applications have been developed to perform functions in response to user requests. Such virtual assistant applications may be used, for example, for information retrieval, navigation, but also a wide variety of requests. A conventional virtual assistant application, such as Siri® for example, can receive a spoken user utterance in a form of digital audio signal from a device and perform a large variety of tasks for the user. For example, a user can communicate with Siri® by providing spoken utterances for asking, for example, what the current weather is, where the nearest shopping mall is, and the like. The user can also ask for the execution of various applications installed on the electronic device.

Generally speaking, conventional virtual assistant applications are trained to generate plurality of hypotheses based on an utterance and select the most likely hypothesis as the correct textual representation of the utterance by based on phrases that it has been previously trained on.

U.S. Pat. No. 5,040,215 issued Aug. 13, 1991 to Hitachi Ltd., and titled "Speech Recognition Apparatus Using Neural Network and Fuzzy Logic" teaches a speech recognition apparatus that has a speech input unit for inputting a speech; a speech analysis unit for analyzing the inputted speech to output the time series of a feature vector; a candidates selection unit for inputting the time series of a feature vector from the speech analysis unit to select a plurality of candidates of recognition result from the speech categories; and a discrimination processing unit for discriminating the selected candidates to obtain a final recognition result. The discrimination processing unit includes three components in the form of a pair generation unit for generating all of the two combinations of the n-number of candidates selected by said candidate selection unit, a pair discrimination unit for discriminating which of the candidates of the combinations is more certain for each of all $_nC_2$-number of combinations (or pairs) on the basis of the extracted result of the acoustic feature intrinsic to each of said candidate speeches, and a final decision unit for collecting all the pair discrimination results obtained from the pair discrimination unit for each of all the $_nC_2$-number of combinations (or pairs) to decide the final result. The pair discrimination unit handles the extracted result of the acoustic feature intrinsic to each of the candidate speeches as fuzzy information and accomplishes the discrimination processing on the basis of fuzzy logic algorithms, and the final decision unit accomplishes its collections on the basis of the fuzzy logic algorithms.

United States Patent Application Publication No. 2017/193387 A1 published Jul. 6, 2017 to Nuance Communications Inc., and titled "Probabilistic Ranking for Neural Language Understanding" teaches natural language processing or natural language understanding and that may include a determination of a probabilistic or probability-based ranking of potential results. For example, natural language input may be received such as speech or text. Natural language processing may be performed to determine one or more potential results for the input. A pairwise classifier may be used to determine a score for element pairs in the potential results. Based on the scores, probabilities for the element pairs may be determined. Based on the probabilities for the element pairs, further probabilities may be determined such as by estimating the probability that a current result is the top rank or best choice. Based on the estimated probabilities that the current result is the top rank or best choice, a ranking may be determined, which may form the basis for natural language understanding output.

United States Patent Application Publication No. 2018/130460 A1 published May 15, 2018 to International Business Machines Corp, and titled "Splitting Utterances for Quick Responses" teaches method that includes preparing, by a processor, pairs for an information retrieval task. Each pair includes (i) a training-stage speech recognition result for a respective sequence of training words and (ii) an answer label corresponding to the training-stage speech recognition result. The method further includes obtaining, by the processor, a respective rank for the answer label included in each pair to obtain a set of ranks. The method also includes determining, by the processor, for each pair, an end of question part in the training-stage speech recognition result based on the set of ranks. The method additionally includes building, by the processor, the classifier such that the classifier receives a recognition-stage speech recognition result and returns a corresponding end of question part for the recognition-stage speech recognition result, based on the end of question part determined for the pairs.

SUMMARY

It is an object of the present technology to ameliorate at least some of the inconveniences present in the prior art. Developers of the present technology envisage a method and system for generating the textual representation of a user spoken utterance that takes into account the characteristics of the user as well as the acoustic properties of the utterance.

Developers of the present technology have appreciated certain technical drawbacks associated with the existing virtual assistant applications. Conventional virtual assistant applications are focused on determining the correct hypothesis based on hypothesis-level features, or, in other words, with features associated with each of the generated hypothesis. However, even with a large amount of training data set, many factors affect the determination of a correct textual representation of the user utterance. For example, humans naturally shift the pitch of the utterance when speaking in a noisy environment, which may affect determination of the correct textual representation of the utterance. Moreover, there is a need for the virtual assistant application to differentiate between ambient noise and the utterance. Moreover, the tone may be different from a speaker to another, depending on the age and the gender of the speaker.

In accordance with a broad aspect of the present technology, there is provided a computer-implemented method for generating a textual representation of a user spoken utterance, the method being executable by an electronic device. The method comprises: receiving, by the electronic device from a user, an indication of the user spoken utterance, the user spoken utterance being expressed in a natural language; generating, by the electronic device, at least two hypotheses based on the user spoken utterance, each of the at least two hypotheses corresponding to a possible textual representation of the user spoken utterance; generating, by the electronic device, from the at least two hypotheses a set of paired hypotheses, a given one of the set of paired hypotheses including a first hypothesis paired with a second hypothesis; determining, using a pairwise classifier executable by the electronic device, for the given one of the set of paired hypotheses, a pair score, the pair score being indicative of a respective probability of the first hypothesis and the second hypothesis corresponding to a correct representation of the user spoken utterance; generating a set of utterance features, the set of utterance features being indicative of one or more characteristics associated with the user spoken utterance; ranking, by a ranking algorithm executable by the electronic device, the first hypothesis and the second hypothesis based at least on the pair score and the set of utterance features; and in response to the first hypothesis being a highest ranked hypothesis, selecting the first hypothesis as the textual representation of the user spoken utterance.

In some non-limiting embodiments, the at least two hypotheses includes the first hypothesis, the second hypothesis and at least one additional hypothesis; the set of paired hypotheses includes a plurality of paired hypotheses comprising each of the at least two hypotheses paired with each of a remaining one of the at least two hypotheses; and determining the pair score comprises: determining, a set of paired scores comprising one or more paired scores associated with each of the plurality of paired hypothesis.

In some non-limiting embodiments, the ranking by the ranking algorithm comprises ranking the at least two hypotheses based at least on an entirety of the set of paired scores and the set of utterance features.

In some non-limiting embodiments, determining the pair score includes: determining a first score, the first score being indicative of a relative probability of the first hypothesis corresponding to the correct representation of the user spoken utterance than the second hypothesis; determining a second score, the second score being indicative of the relative probability of the second hypothesis corresponding to the correct representation of the user spoken utterance than the first hypothesis; determining a first normalized score and a second normalized score; the first normalized score being based on the first score; the second normalized score being based on the second score; and such that the first normalized score and the second normalized score add up together to a pre-determined total score.

In some non-limiting embodiments, the method further comprises: generating a first hypothesis profile, the first hypothesis profile corresponding to a first set of vector values representing one or more context-specific characteristics of the first hypothesis; generating a second hypothesis profile, the second hypothesis profile corresponding to a second set of vector values representing one or more context-specific characteristics of the second hypothesis; and wherein the generating the pair score comprises: generating the pair score based at least on the first hypothesis profile and the second hypothesis profile.

In some non-limiting embodiments, the pairwise classifier is a Price, Kner, Personnaz and Dreyfus (PKPD) algorithm; and wherein the method further comprises; training the PKPD algorithm using a training set of data prior to the receiving the user spoken utterance, the training set of data comprising at least: a training pair of hypothesis including a first training hypothesis paired with a second training hypothesis, each of the first training hypothesis and the second training hypothesis having been generated in response to a training utterance; a first training hypothesis profile, the first training hypothesis profile corresponding to a first training set of vector values representing one or more context-specific features of the first training hypothesis; a second training hypothesis profile, the second training hypothesis profile corresponding to a second training set of vector values representing one or more context-specific features of the second training hypothesis; a difference-in-profile score, the difference-in-profile score corresponding to a difference between the first training set of vector values and the second training set of vector values; an aggregated profile score, the aggregated profile score corresponding to a quotient of the first training set of vector values and the second training set of vector values; and a label indicative of one of the first training hypothesis and the second training hypothesis corresponding to the training utterance.

In some non-limiting embodiments, generating the first hypothesis profile comprises: analyzing, the first hypothesis using one or more context-specific models, each of the one or more context-specific models being trained on a plurality of context-specific words; assigning, by each of the one or more context-specific models, a respective context-specific score corresponding to a vector value, a given vector value representing a proportion of context-specific words associated with a given context-specific model within the first hypothesis; and aggregating the one or more vector values assigned by each of the one or more context-specific models.

In some non-limiting embodiments, the set of utterance features includes user-specific features, the user-specific features comprising at least one of: an age of the user; a gender of the user; and an interest profile of the user.

In some non-limiting embodiments, the electronic device is further communicatively coupled to a database comprising one of a browsing log and a search log associated with the user, and wherein the user-specific features are generated based on at least one of: a browsing history associated with the user; and a search history associated with the user.

In some non-limiting embodiments, the electronic device is a user device, and wherein the user-specific features are generated based on previous interactions of the user with the user device.

In some non-limiting embodiments, wherein the set of utterance features includes acoustic features, the acoustic features comprising at least one of: a tone of the user spoken utterance; a pitch of the user spoken utterance; and a noise-to-signal ratio.

In some non-limiting embodiments, the electronic device is a server; wherein the server is coupled to a user device associated with the user; and wherein receiving the user spoken utterance from the user comprises receiving the user spoken utterance from the user device.

In some non-limiting embodiments, the ranking algorithm is a neural network; and the method further comprises training the neural network using a training set of data prior to receiving the natural language input.

In accordance with another broad aspect of the present technology, there is provided a computer-implemented method for generating a textual representation of a user spoken utterance, the method being executable by an electronic device. The method comprises: receiving, by the electronic device from a user, an indication of the user spoken utterance, the user spoken utterance being expressed in a natural language; generating, by the electronic device, at least two hypotheses based on the user spoken utterance, each of the at least two hypotheses corresponding to a possible textual representation of the user spoken utterance; generating, by the electronic device, a set of paired hypotheses, the set of paired hypotheses comprising (i) each given one of the at least two hypotheses paired with (ii) each of a remaining one of the at least two hypotheses; determining, using a pairwise classifier executable by the electronic device, a set of pair scores, the set of pair scores including a pair score for each of the paired hypothesis within the set of paired hypotheses, a given pair score for a given paired hypothesis being indicative of a respective probability of a first hypothesis and a second hypothesis of the given paired hypothesis corresponding to a correct representation of the user spoken utterance; ranking the at least two hypotheses by a ranking algorithm executable by the electronic device, the ranking algorithm being configured to rank the at least two hypotheses based on an entirety of the set of pair scores; in response to the first hypothesis being a highest ranked hypothesis, selecting the first hypothesis as the textual representation of user spoken utterance.

In accordance with yet another broad aspect of the present technology, there is provided a system for generating a textual representation of a user spoken utterance, the system comprising an electronic device comprising a processor configured to: receive, by the electronic device from a user, an indication of the user spoken utterance, the user spoken utterance being expressed in a natural language; generate, by the electronic device, at least two hypotheses based on the user spoken utterance, each of the at least two hypotheses corresponding to a possible textual representation of the user spoken utterance; generate, by the electronic device, from the at least two hypotheses a set of paired hypotheses, a given one of the set of paired hypotheses including a first hypothesis paired with a second hypothesis; determine, using a pairwise classifier executable by the electronic device, a set of pair scores, the set of pair scores including comprising a pair score associated with the given one of the set of paired hypotheses, the pair score being indicative of a respective probability of the first hypothesis and the second hypothesis corresponding to a correct representation of the user spoken utterance; generate a set of utterance features, the set of utterance features being indicative of one or more characteristics associated with the user spoken utterance; rank, by a ranking algorithm executable by the electronic device, the first hypothesis and the second hypothesis based at least on the entirety of the set of pair scores and the set of utterance features; and in response to the first hypothesis being a highest ranked hypothesis, select the first hypothesis as the textual representation of user spoken utterance.

In some non-limiting embodiments, the at least two hypotheses includes the first hypothesis, the second hypothesis and at least one additional hypothesis; the set of paired hypotheses includes a plurality of paired hypotheses comprising each of the at least two hypotheses paired with each of a remaining one of the at least two hypotheses; and wherein to determine the pair score, the processor is configured to: determine, a set of paired scores comprising one or more paired scores associated with each of the plurality of paired hypothesis.

In some non-limiting embodiments, to determine the pair score, the processor is configured to: determine a first score, the first score being indicative of a relative probability of the first hypothesis corresponding to the correct representation of the user spoken utterance than the second hypothesis; determine a second score, the second score being indicative of the relative probability of the second hypothesis corresponding to the correct representation of the user spoken utterance than the first hypothesis; determine a first normalized score and a second normalized score; the first normalized score being based on the first score; the second normalized score being based on the second score; and such that the first normalized score and the second normalized score add up together to a pre-determined total score.

In some non-limiting embodiments, the set of utterance features includes user-specific features, the user-specific features comprising at least one of: an age of the user; a gender of the user; and an interest profile of the user.

In some non-limiting embodiments, the set of utterance features includes acoustic features, the acoustic features comprising at least one of: a tone of the user spoken utterance; a pitch of the user spoken utterance; and a noise-to-signal ratio.

In some non-limiting embodiments, the ranking algorithm is a neural network; and the processor is further configured to train the neural network using a training set of data prior to receiving the natural language input.

In the context of the present specification, a "server" is a computer program that is running on appropriate hardware and is capable of receiving requests (e.g., from client devices) over a network, and carrying out those requests, or causing those requests to be carried out. The hardware may be one physical computer or one physical computer system, but neither is required to be the case with respect to the present technology. In the present context, the use of the expression a "server" is not intended to mean that every task (e.g., received instructions or requests) or any particular task will have been received, carried out, or caused to be carried out, by the same server (i.e., the same software and/or hardware); it is intended to mean that any number of software elements or hardware devices may be involved in receiving/sending, carrying out or causing to be carried out any task or request, or the consequences of any task or request; and all of this software and hardware may be one server or multiple servers, both of which are included within the expression "at least one server".

In the context of the present specification, "client device" is any computer hardware that is capable of running software appropriate to the relevant task at hand. Thus, some (non-limiting) examples of client devices include personal computers (desktops, laptops, netbooks, etc.), smartphones, and tablets, as well as network equipment such as routers, switches, and gateways. It should be noted that a device acting as a client device in the present context is not precluded from acting as a server to other client devices. The use of the expression "a client device" does not preclude multiple client devices being used in receiving/sending, carrying out or causing to be carried out any task or request, or the consequences of any task or request, or steps of any method described herein.

In the context of the present specification, a "database" is any structured collection of data, irrespective of its particular structure, the database management software, or the computer hardware on which the data is stored, implemented or otherwise rendered available for use. A database may reside on the same hardware as the process that stores or makes use of the information stored in the database or it may reside on separate hardware, such as a dedicated server or plurality of servers.

In the context of the present specification, the expression "information" includes information of any nature or kind whatsoever capable of being stored in a database. Thus information includes, but is not limited to audiovisual works (images, movies, sound records, presentations etc.), data (location data, numerical data, etc.), text (opinions, comments, questions, messages, etc.), documents, spreadsheets, lists of words, etc.

In the context of the present specification, the expression "component" is meant to include software (appropriate to a particular hardware context) that is both necessary and sufficient to achieve the specific function(s) being referenced.

In the context of the present specification, the expression "computer usable information storage medium" is intended to include media of any nature and kind whatsoever, including RAM, ROM, disks (CD-ROMs, DVDs, floppy disks, hard drivers, etc.), USB keys, solid state-drives, tape drives, etc.

In the context of the present specification, the words "first", "second", "third", etc. have been used as adjectives only for the purpose of allowing for distinction between the nouns that they modify from one another, and not for the purpose of describing any particular relationship between those nouns. Thus, for example, it should be understood that, the use of the terms "first server" and "third server" is not intended to imply any particular order, type, chronology, hierarchy or ranking (for example) of/between the server, nor is their use (by itself) intended imply that any "second server" must necessarily exist in any given situation. Further, as is discussed herein in other contexts, reference to a "first" element and a "second" element does not preclude the two elements from being the same actual real-world element. Thus, for example, in some instances, a "first" server and a "second" server may be the same software and/or hardware, in other cases they may be different software and/or hardware.

Implementations of the present technology each have at least one of the above-mentioned object and/or aspects, but do not necessarily have all of them. It should be understood that some aspects of the present technology that have resulted from attempting to attain the above-mentioned object may not satisfy this object and/or may satisfy other objects not specifically recited herein.

Additional and/or alternative features, aspects and advantages of implementations of the present technology will become apparent from the following description, the accompanying drawings and the appended claims.

BRIEF DESCRIPTION OF THE DRAWINGS

For a better understanding of the present technology, as well as other aspects and further features thereof, reference is made to the following description which is to be used in conjunction with the accompanying drawings, where.

DETAILED DESCRIPTION

Figure 1:
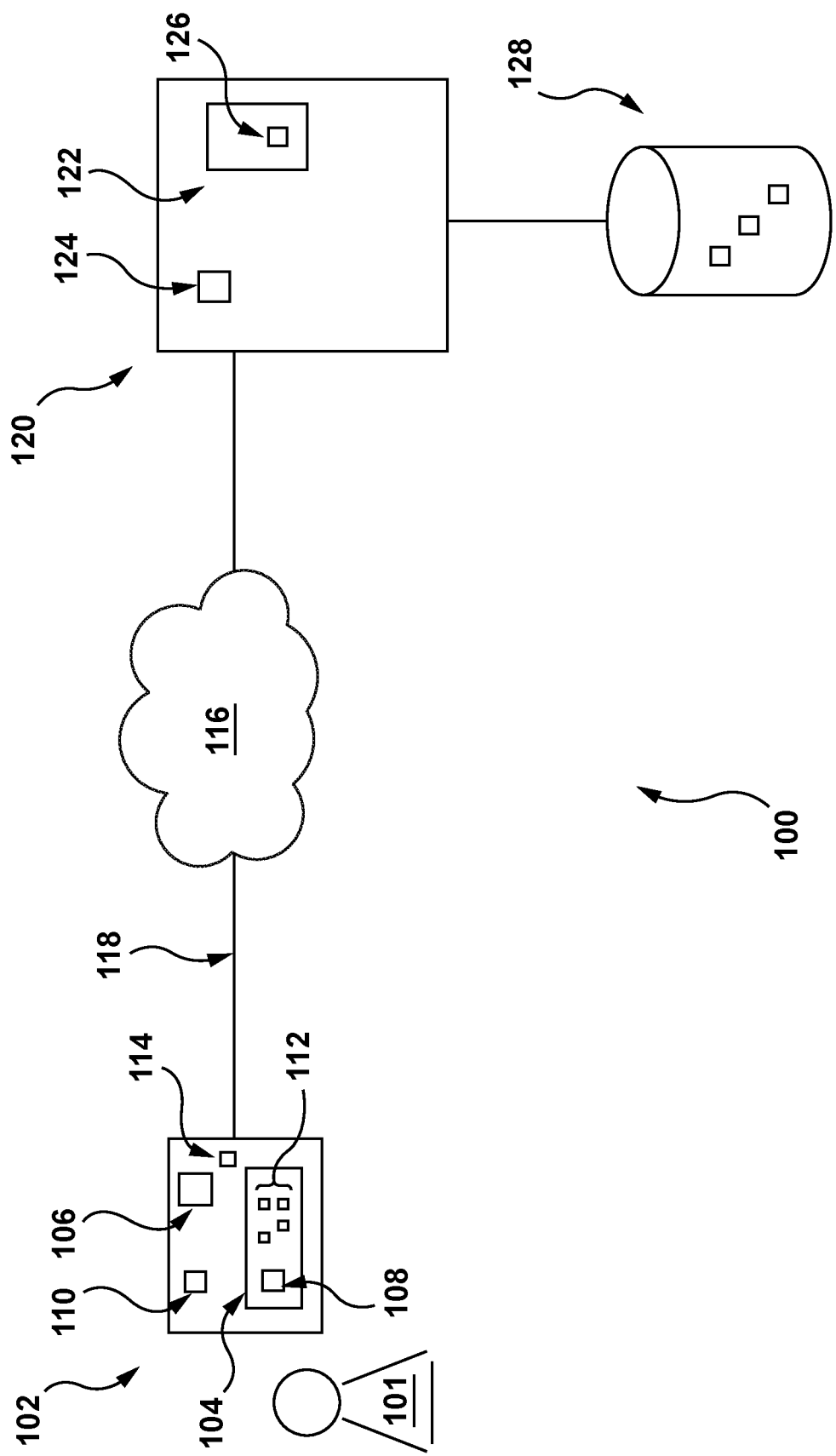
FIG. 1 depicts a schematic diagram of a system implemented in accordance with non-limiting embodiments of the present technology.

Referring to FIG. 1, there is shown a schematic diagram of a system 100, the system 100 being suitable for implementing non-limiting embodiments of the present technology. It is to be expressly understood that the system 100 is depicted merely as an illustrative implementation of the present technology. Thus, the description thereof that follows is intended to be only a description of illustrative examples of the present technology. This description is not intended to define the scope or set forth the bounds of the present technology. In some cases, what are believed to be helpful examples of modifications to the system 100 may also be set forth below. This is done merely as an aid to understanding, and, again, not to define the scope or set forth the bounds of the present technology. These modifications are not an exhaustive list, and as a person skilled in the art would understand, other modifications are likely possible. Further, where this has not been done (i.e. where no examples of modifications have been set forth), it should not be interpreted that no modifications are possible and/or that what is described is the sole manner of implementing that element of the present technology. As a person skilled in the art would understand, this is likely not the case. In addition, it is to be understood that the system 100 may provide in certain instances simple implementations of the present technology, and that where such is the case they have been presented in this manner as an aid to understanding. As persons skilled in the art would understand, various implementations of the present technology may be of a greater complexity.

The examples and conditional language recited herein are principally intended to aid the reader in understanding the principles of the present technology and not to limit its scope to such specifically recited examples and conditions. It will be appreciated that those skilled in the art may devise various arrangements which, although not explicitly described or shown herein, nonetheless embody the principles of the present technology and are included within its spirit and scope. Furthermore, as an aid to understanding, the following description may describe relatively simplified implementations of the present technology. As persons skilled in the art would understand, various implementations of the present technology may be of greater complexity.

Moreover, all statements herein reciting principles, aspects, and implementations of the present technology, as well as specific examples thereof, are intended to encompass both structural and functional equivalents thereof, whether they are currently known or developed in the future. Thus, for example, it will be appreciated by those skilled in the art that any block diagrams herein represent conceptual views of illustrative circuitry embodying the principles of the present technology. Similarly, it will be appreciated that any flowcharts, flow diagrams, state transition diagrams, pseudo-code, and the like represent various processes which may be substantially represented in computer-readable media and so executed by a computer or processor, whether or not such computer or processor is explicitly shown.

The functions of the various elements shown in the figures, including any functional block labelled as a "processor" may be provided through the use of dedicated hardware as well as hardware capable of executing software in association with appropriate software. When provided by a processor, the functions may be provided by a single dedicated processor, by a single shared processor, or by a plurality of individual processors, some of which may be shared. In some non-limiting embodiments of the present technology, the processor may be a general purpose processor, such as a central processing unit (CPU) or a processor dedicated to a specific purpose, such as a graphics processing unit (GPU). Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read-only memory (ROM) for storing software, random access memory (RAM), and non-volatile storage. Other hardware, conventional and/or custom, may also be included.

With these fundamentals in place, we will now consider some non-limiting examples to illustrate various implementations of aspects of the present technology.

The system 100 comprises an electronic device 102. The electronic device 102 is associated with a user 101 and, as such, can sometimes be referred to as a "client device". It should be noted that the fact that the electronic device 102 is associated with the user 101 does not mean to suggest or imply any mode of operation—such as a need to log in, a need to be registered or the like.

In the context of the present specification, unless provided expressly otherwise, "electronic device" is any computer hardware that is capable of running a software appropriate to the relevant task at hand. Thus, some (non-limiting) examples of electronic devices include personal computers (desktops, laptops, netbooks, etc.), smartphones, and tablets. It should be noted that a device acting as an electronic device in the present context is not precluded from acting as a server to other electronic devices. The use of the expression "an electronic device" does not preclude multiple client devices being used in receiving/sending, carrying out or causing to be carried out any task or request, or the consequences of any task or request, or steps of any method described herein.

The electronic device 102 comprises a permanent storage 104. The permanent storage 104 may encompass one or more storage media and generally provides a place to store computer-executable instructions executable by a processor 106. By way of an example, the permanent storage 104 may be implemented as a computer-readable storage medium including Read-Only Memory (ROM), hard disk drives (HDDs), solid-state drives (SSDs), and flash-memory cards.

The electronic device 102 comprises hardware and/or software and/or firmware (or a combination thereof) to execute a virtual assistant application 108. Generally speaking, the virtual assistant application 108 is capable of hands-free activation in response to one or more "hot words", and able to perform tasks or services in response to a command received by the user 101. For example, the virtual assistant application 108 may be implemented as an ALICE digital assistant (provided by Yandex LLC of Lev Tolstoy Street, No. 16, Moscow, 119021, Russia) on a smartphone, or other commercial or proprietary virtual assistant applications. As such, the electronic device 102 may receive a command via a microphone 110 implemented within the electronic device 102. In some non-limiting embodiments of the present technology, the microphone 110 is a stand-alone device communicatively coupled with the electronic device 102.

Generally speaking, the virtual assistant application 108 comprises (or otherwise has access to) an analog-to-digital converter (not shown), configured to convert the command, in the form of an analog signal received by the microphone 110 from the user 101, into a digital signal.

The electronic device 102 further comprises hardware and/or software and/or firmware (or a combination thereof) to execute one or more service applications 112. Generally speaking, the one or more service applications 112 correspond to electronic applications accessible by the electronic device 102. In some non-limiting embodiments of the present technology, the one or more service applications 112 comprise at least one service application (not numbered) that is operated by the same entity that has provided the afore-described virtual assistant application 108. For example, if the virtual assistant application 108 is the ALICE digital assistant, the one or more service applications 112 may include a Yandex.Browser™ web browser application, a Yandex.News™ news application, a Yandex.Market™ market application, and the like. Needless to say, the one or more service applications 112 may also include service applications that are not operated by the same entity that has provided the afore-mentioned virtual assistant application 108, and may comprise for example, social media applications such as Vkontakte™ social media application, and music streaming application such as Spotify™ music streaming application.

In some non-limiting embodiments of the present technology, the virtual assistant application 108 is configured to assign a user device ID 114 to the electronic device 102. For example, the user device ID 114 may correspond to a proprietary ID number assigned by the virtual assistant application 108 as well as other related one or more service applications 112 (described below).

In some non-limiting embodiments of the present technology, the activities of the user executed on each of the one or more service applications 112 are collected by one or more associated web servers (not shown), and are used to build a profile of the user associated with the electronic device 102. In some non-limiting embodiments of the present technology, the one or more service applications 112 that are operated by the same entity as the virtual assistant application 108 are configured to store the collected activities with an indication of the user device ID 114 (described in more detail below).

In some non-limiting embodiments of the present technology, the electronic device 102 is implemented as a smart device, such as a Yandex.Station™. When implemented as a smart device, it is contemplated that a client device, such as a smart phone (not illustrated), associated with the user 101 is synced with the electronic device 102, thereby obtaining the user device ID 114 from the client device. Alternatively, the smart device may be implemented with a suitable communication interface (as one described immediately below) for obtaining the user device ID 114 from a server responsible for the service that the smart device delivers.

The electronic device 102 comprises a communication interface (not depicted) for enabling two-way communication with a communication network 116 via a communication link 118. In some non-limiting embodiments of the present technology, the communication network 116 can be implemented as the Internet. In other embodiments of the present technology, the communication network 116 can be implemented differently, such as any wide-area communication network, local area communications network, a private communications network and the like.

How the communication link 118 is implemented is not particularly limited and depends on how the electronic device 102 is implemented. Merely as an example and not as a limitation, in those embodiments of the present technology where the electronic device 102 is implemented as a wireless communication device (such as a smart phone), the communication link 118 can be implemented as a wireless communication link (such as, but not limited to, a 3G communications network link, a 4G communications network link, a Wireless Fidelity, or WiFi®, for short, Bluetooth®, or the like) or wired (such as an Ethernet based connection).

It should be expressly understood that implementations for the electronic device 102, the communication link 118 and the communication network 116 are provided for illustration purposes only. As such, those skilled in the art will easily appreciate other specific implementational details for the electronic device 102, the communication link 118, and the communication network 116. As such, by no means the examples provided hereinabove are meant to limit the scope of the present technology.

The system further includes a server 120 coupled to the communication network 116. The server 120 can be implemented as a computer server. In an example of an embodiment of the present technology, the server 120 can be implemented as a Dell™ PowerEdge™ Server running the Microsoft Windows Server™ operating system. Needless to say, the server 120 can be implemented in any other suitable hardware and/or software and/or firmware or a combination thereof. In the depicted non-limiting embodiment of the present technology, the server 120 is a single server. In alternative non-limiting embodiments of the present technology, the functionality of the server 120 may be distributed and may be implemented via multiple servers.

The server 120 comprises a communication interface (not depicted) structured and configured to communicate with various entities (such as the electronic device 102 and other devices potentially coupled to the communication network 116) via the communication network 116. The server 120 comprises a server memory 122, which comprises one or more storage media and generally provides a place to store computer-executable program instructions executable by a server processor 124. By way of example, the server memory 122 may be implemented as a tangible computer-readable storage medium including Read-Only Memory (ROM) and/or Random-Access Memory (RAM). The server memory 122 may also include one or more fixed storage devices in the form of, by way of example, hard disk drives (HDDs), solid-state drives (SSDs), and flash-memory cards.

In some non-limiting embodiments of the present technology, the server 120 can be operated by the same entity that has provided the afore-described virtual assistant application 108. For example, if the virtual assistant application 108 is an ALICE digital assistant, the server 120 can also be operated by Yandex LLC of Lev Tolstoy Street, No. 16, Moscow, 119021, Russia. In alternative embodiments, the server 120 can be operated by an entity different from the one that has provided the aforementioned virtual assistant application 108.

In some non-limiting embodiments of the present technology, the server 120 is configured to execute an automated speech recognition application 126 (the "ASR application 126" for short). The manner in which the ASR application 126 is implemented will be described in detail below.

To that end, the server 120 is communicatively coupled to a database 128. In alternative non-limiting embodiments, the database 128 may be communicatively coupled to the server 120 via the communication network 116. Although the database 128 is illustrated schematically herein as a single entity, it is contemplated that the database 128 may be configured in a distributed manner.

The database 128 is populated with a plurality of user profiles (not separately numbered). How the one or more user profiles are implemented is not limited, and may for example be a set of vectors representing the interests of a given user.

Figure 2:
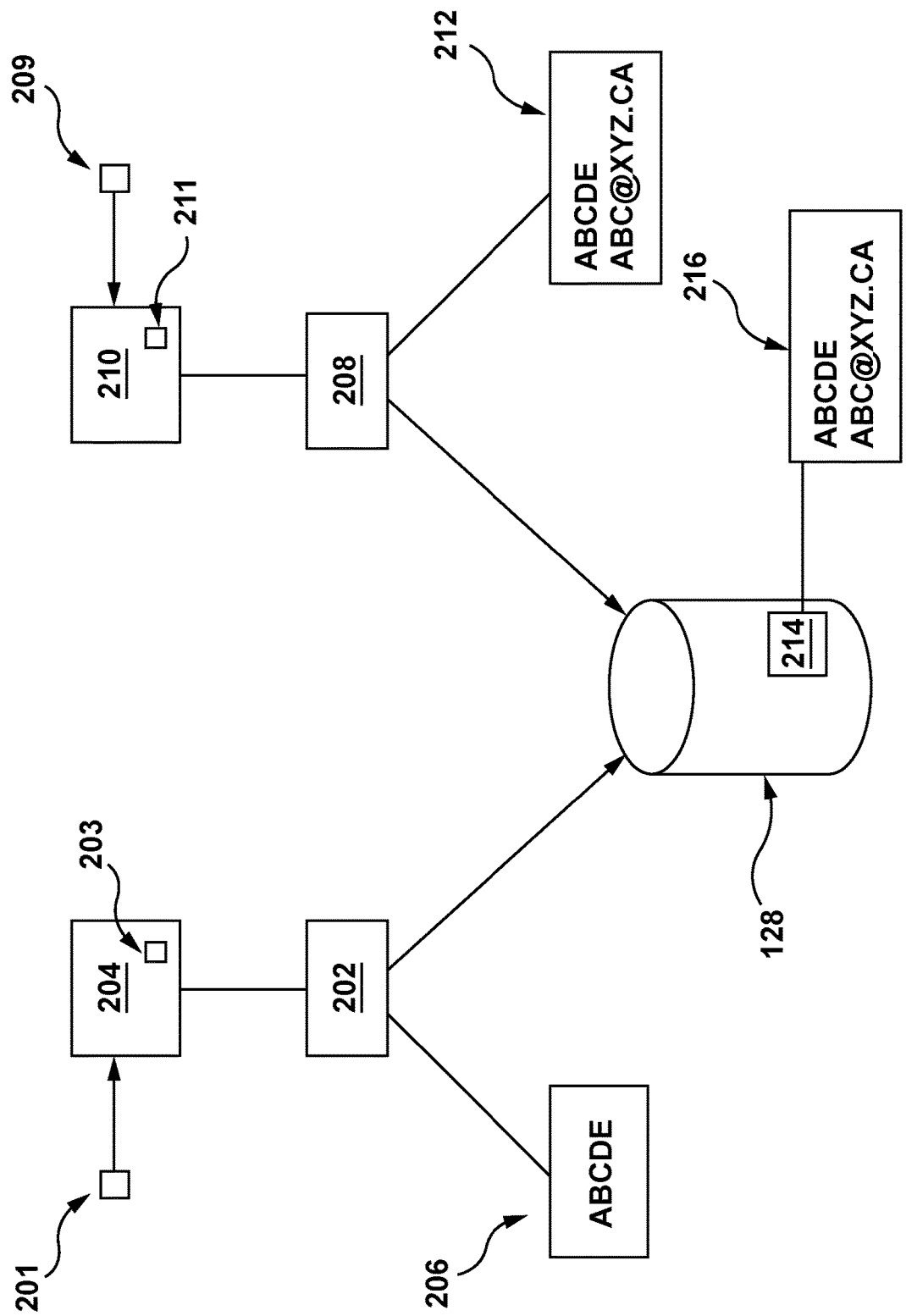
FIG. 2 depicts a schematic diagram of a process for generating an aggregated user profile.

With reference to FIG. 2, a schematic illustration of a process for the aggregation of different user profiles associated with the user 101 is depicted.

A first profile 202 is received from a first service server 204. For example, the first service server 204 may be associated with a first service application 201 that corresponds to Yandex.Browser™, which is operated by the same entity providing the aforementioned virtual assistant application 108. The first profile 202 may be generated by the first service server 204 based on browsing logs 203 associated with the electronic device 102. In some non-limiting embodiments of the present technology, the browsing logs 203 may be limited in time or in action. Just as an example, the browsing logs 203 may comprise web resources visited in the previous 24 hours, or the last 100 web resources visited. Needless to say, other time period or actions may be used.

The first profile 202 is associated with a first set of unique IDs 206. For example, the first set of unique IDs 206 may include a proprietary user ID assigned to the electronic device 102 by the first service application 201. Recalling that the first service application 201 is operated by the same entity providing the aforementioned virtual assistant application 108, the first set of unique IDs 206 comprises the user device ID 114 (corresponding to "ABCDE").

A second profile 208 is received from a second service server 210. For example, the second service server 210 may be associated with a second service application 209 that corresponds to Yandex.Market™, which is operated by the same entity providing the aforementioned virtual assistant application 108. The second profile 208 may be generated by the second service server 210 based on search logs 211 associated with the electronic device 102 as well as use-related information required for sign-in, such as age, gender, location of the user, interests and the like. In some non-limiting embodiments of the present technology, the search logs 211 may be limited in time or in action. For example, the search logs 211 may comprise the search strings inputted in the previous 24 hours, or the last 100 search strings. Needless to say, other time period or actions may be used.

The second profile 208 is also associated with a second set of unique IDs 212. Recalling that the second service application 209 is operated by the same entity providing the aforementioned virtual assistant application 108, the second set of unique IDs 212 comprises the user device ID 114

("ABCDE"). Additionally, the second set of unique IDs 212 may also comprise the email address of the user 101 used for sign-in (ABC@XYZ.CA).

The database 128 is configured to execute a profile aggregation routine (not depicted). The profile aggregation routine is configured to determine if the first profile 202 and the second profile 208 corresponds to the same user. For example, the profile aggregation routine may be configured to determine if the first set of unique IDs 206 corresponds, at least partially, to the second set of unique IDs 212.

If it is determined that the first set of unique IDs 206 corresponds at least partially to the second set of unique IDs 212, the profile aggregation routine is configured to aggregate the first profile 202 and the second profile 208 to generate a first aggregated user profile 214.

As a result of the execution of the profile aggregation routine, the database 128 stores the first aggregated user profile 214 together with a list of associated unique IDs 216 (which comprises the user device ID 114 and the email address).

On the other hand, if the profile aggregation routine determines that the first set of unique IDs 206 does not correspond even partially to the second set of unique IDs 212, the first profile 202 and the second profile 208 are considered to be associated with different users. Consequently, the database 128 stores the first profile 202 (and the first set of unique IDs 206) and the second profile 208 (and the second set of unique IDs 212) separately.

Needless to say, it is contemplated that the server 120 can be communicatively coupled to the first service server 204 and the second service server 210 and the server processor 124 is configured to execute the profile aggregation routine instead of the database 128, to generate and store the first aggregated user profile 214 within the database 128.

Moreover, although only two user profiles (the first profile 202 and the second profile 208) are illustrated to generate the first aggregated user profile 214, it should be understood that the first aggregated user profile 214 may be generated based on more than two user profiles. For example, in addition to the first profile 202 and the second profile 208, it is contemplated that a third profile (not shown) may be received from a third service application (not shown) associated with a third service application corresponding (not shown) to a search application such as Yandex™ search engine which is operated by the same entity providing the aforementioned virtual assistant application 108. The third profile may be generated by the third service server based on search logs (not shown) associated with the electronic device 102.

Moreover, although the first aggregated user profile 214 has been generated based solely on service applications that are operated by the same entity, it is not limited as such. Given that the second profile 208 includes the email address associated with the user 101, it is possible to further aggregate the user's profile with a fourth profile (not shown) that is received from a different entity (such as Spotify™), provided that the fourth profile is also associated with a unique ID that corresponds to the same email address as the one included within the list of associated unique IDs 216.

ASR Application 126

Figure 3:
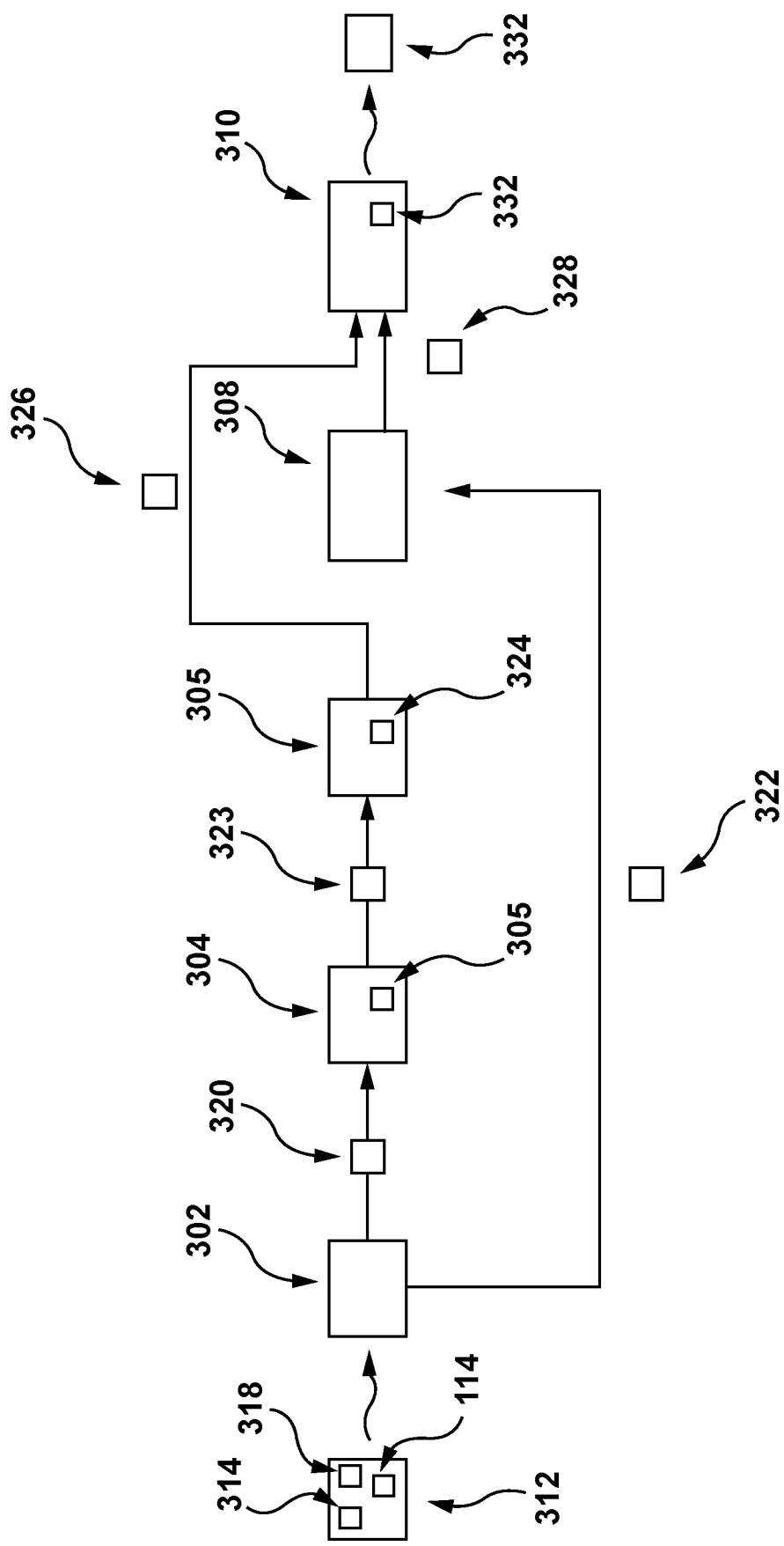
FIG. 3 depicts an example process for determining a textual representation of a user spoken utterance.

With reference to FIG. 3, there is depicted a schematic illustration of the ASR application 126 implemented in accordance with a non-limiting embodiment of the present technology. The ASR application 126 executes (or otherwise has access to): a receiving routine 302, a hypothesis generating routine 304, a pairing routine 306, an utterance analysis routine 308, and a ranking routine 310.

In the context of the present specification, the term "routine" refers to a subset of the computer executable program instructions of the ASR application 126 that is executable by the server processor 124 to perform the functions explained below in association with various routines (the receiving routine 302, the hypothesis generating routine 304, the pairing routine 306, the utterance analysis routine 308 and the ranking routine 310). For the avoidance of any doubt, it should be expressly understood that the receiving routine 302, the hypothesis generating routine 304, the pairing routine 306, the utterance analysis routine 308 and the ranking routine 310 are illustrated schematically herein as separate entities for ease of explanation of the processes executed by the ASR application 126. It is contemplated that some or all of the receiving routine 302, the hypothesis generating routine 304, the pairing routine 306, the utterance analysis routine 308 and the ranking routine 310 may be implemented as one or more combined routines.

For ease of understanding the present technology, functionality of each one of the receiving routine 302, the hypothesis generating routine 304, the pairing routine 306, the utterance analysis routine 308 and the ranking routine 310, as well as data and/or information processed or stored therein are described below.

Receiving Routine 302

The receiving routine 302 is configured to receive a data packet 312 from the virtual assistant application 108. For example, the data packet 312 comprises an utterance 314 of the user 101 expressed in a natural language, as well as the user device ID 114.

The manner in which the data packet 312 is transmitted by the virtual assistant application 108 is not limited, and may for example be in response to the user 101 uttering a command to the virtual assistant application 108. In other words, the virtual assistant application 108 cam be in an "always listen" mode or can "wake up" in response to a pre-determined user spoken utterance. The utterance 314 is transmitted as a digital signal, following a conversion from an analog signal via the analog-to-digital converter.

In some non-limiting embodiments of the present technology, the data packet 312 further comprises a device interaction history 318, which may include a history of interactions of the user 101 with the one or more service applications 112. In some non-limiting embodiments of the present technology, the device interaction history 318 may be limited in time or in action. Just as an example, the device interaction history 318 may comprise of the actions executed with the electronic device 102 for the previous 24 hours, or the last 100 actions. Needless to say, other time period or actions may be used. Alternatively, the device interaction history 318 may be transmitted prior to the transmission of the data packet 312 at pre-determined time intervals.

In response to receiving the data packet 312, the receiving routine 302 is configured to transmit a data packet 320 to the hypothesis generating routine 304. The data packet 320 comprises the utterance 314.

Moreover, the receiving routine 302 is further configured to transmit a data packet 322 to the utterance analysis routine 308. The data packet 322 comprises the user device ID 114 and the device interaction history 318.

Hypothesis Generating Routine 304

In response to receiving the data packet 320, the hypothesis generating routine 304 is configured to execute the following functions.

Firstly, the hypothesis generating routine 304 is configured to execute a speech-to-text application 305 to generate a plurality of hypotheses 426 (see FIG. 4), where each of the plurality of hypotheses 426 corresponds to a potential textual representation of the utterance 314.

How the speech-to-text application 305 is implemented is well known in the art and will not be described in detail herein. Suffice it to say, the speech-to-text application 305 is configured to generate the plurality of hypotheses 426 by analyzing the utterance 314 using an acoustic model (such as a Hidden Markov Model or the like) and a language model (such as n-gram models or the like).

Upon generating the plurality of hypotheses 426, the hypothesis generating routine 304 is further configured to determine a hypothesis profile for each of the plurality of hypotheses 426. For example, the hypothesis profile may include a set of vector values representing one or more context-specific characteristics of a given hypothesis (described in detail above).

Figure 4:
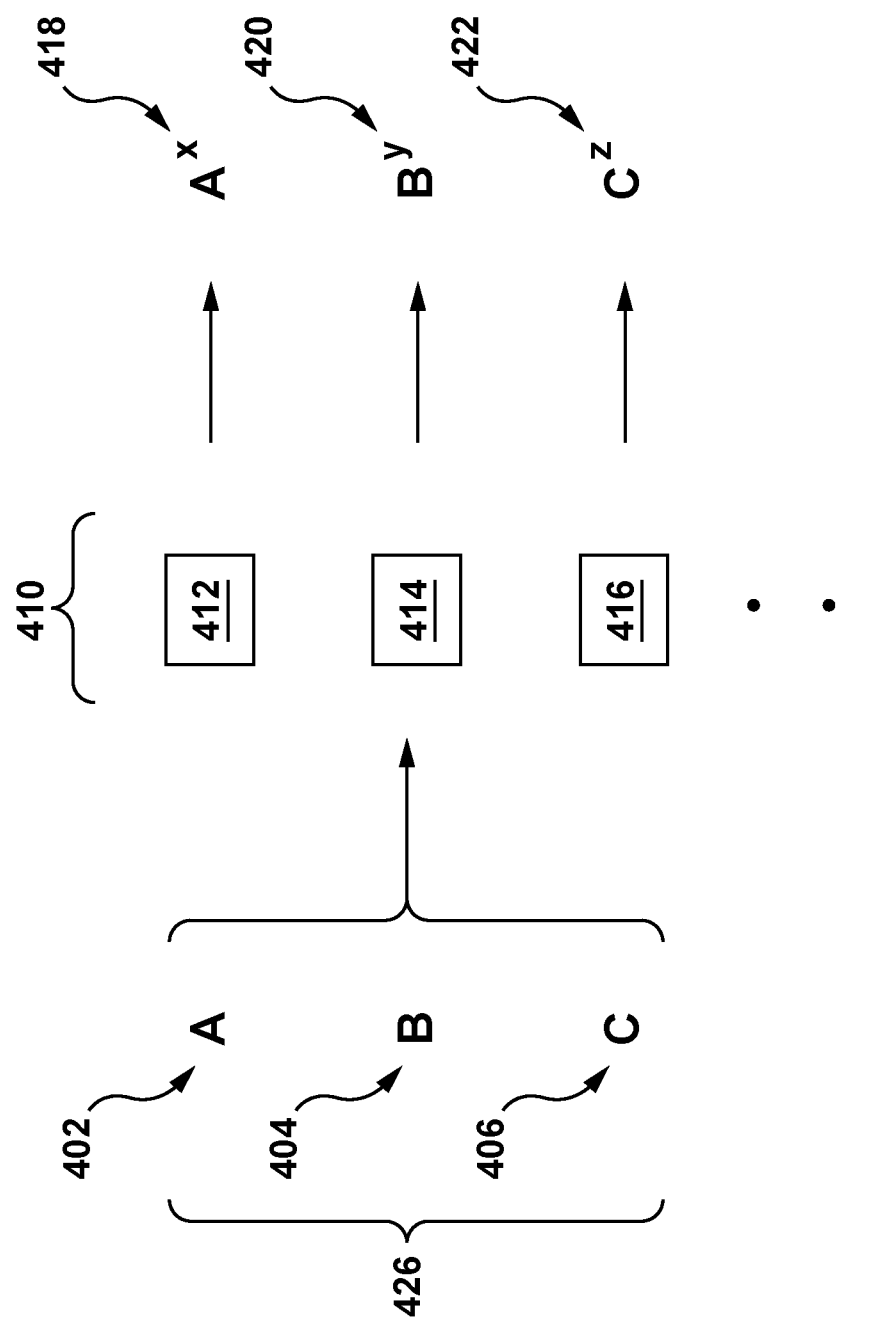
FIG. 4 depicts a schematic illustration of a process of determining a hypothesis profile, executed as part of the process of FIG. 3.

With reference to FIG. 4, a schematic illustration of a process of determining the hypothesis profile for each of the plurality of hypotheses 426 is depicted.

The hypothesis generating routine 304 has generated three hypotheses, namely a first hypothesis 402, a second hypothesis 404, and a third hypothesis 406. Although each of the first hypothesis 402, the second hypothesis 404, and the third hypothesis 406 is schematically illustrated as corresponding to a letter ("A", "B", "C"), it is done so for ease of understanding, and it should be understood that each of the first hypothesis 402, the second hypothesis 404, and the third hypothesis 406 corresponds to a word or a sequence of words. For example, the first hypothesis 402 may correspond to "Play Korn" (i.e. the music band), and the second hypothesis 404 may correspond to "pay corn", and so on.

Needless to say, although only three hypotheses are illustrated, it is not limited as such. It is contemplated that more or less than three hypotheses be generated by the speech-to-text application 305.

Now, taking the first hypothesis 402 as an example, the manner in which a first hypothesis profile 418 is generated will now be explained.

Firstly, the first hypothesis 402 is analyzed by one or more context-specific models 410 (namely a first model 412, a second model 414 and a third model 416). Each of the first model 412, the second model 414 and the third model 416 is a model associated with a particular context or topic, and is configured to generate a context-specific score in the form of a vector value.

For example, the first model 412 is associated with the topic of music, and is therefore configured to generate a music-specific score. The second model 414 is associated with the topic of locations, and is therefore configured to generate a map-specific score. The third model 416 is associated with the topic of cooking, and is therefore configured to generate a cooking-specific score. Needless to say, although only three models (first model 412, second model 414 and third model 416) are illustrated, it is not limited as such, and it contemplated that more or less than three models may be used.

How each of the first model 412, the second model 414 and the third model 416 is configured to generate the respective context-specific score is not limited. In some non-limiting embodiments of the present technology, each of the first model 412, the second model 414 and the third model 416 may be trained on context-specific words associated with their respective context or topic.

For example, the first model 412, which is associated with the topic of music, may be trained on a plurality of music-related words, such as a band names, artist names, genre, and certain verbs associated with music (for example "play").

The first model 412 is then be configured to analyze a given hypothesis and generate the music-specific score. How the music-specific score (or any other context-specific score) is implemented is not limited, and may for example be vector value corresponding to a ratio of music-specific words present in the hypothesis against a total number of words in the hypothesis. Taking the first hypothesis 402 as an example (recalling that the first hypothesis 402 corresponds to "play Korn"), the first model 412 generates a music-specific score indicative that the first hypothesis 402 comprises a ratio of 2:2, as it comprises only music-related words (namely "play" and "Korn").

The first hypothesis 402 is further analyzed by the second model 414 and the third model 416, and a map-specific score and a cooking-specific score are generated. For example, the map-specific score and the cooking-specific score may be indicative that the first hypothesis 402 comprises a ratio of 0:2 for both scores, as it does not include either map-related or cooking-related words.

After generating a context-specific score by each of the one or more context-specific models 410, the hypothesis generating routine 304 is configured to generate the first hypothesis profile 418 associated with the first hypothesis 402, which corresponds to a sum of the generated context-specific scores. Recalling that each of the context-specific scores is a vector value, the first hypothesis profile 418 can be implemented as a set of vector values.

The hypothesis generating routine 304 is further configured to generate (i) the music-specific score to the second hypothesis 404 ("pay corn"), which corresponds to a ratio of 0:2; (ii) the map-specific score to the second hypothesis 404, which corresponds to a ratio of 0:2; and (iii) the cooking-specific score t the second hypothesis 404, which corresponds to 1:2 (due to the presence of the word "corn"). After generating the context-specific score by each of the one or more context-specific models, the hypothesis generating routine 304 is configured to generate a second hypothesis profile 420 associated with the second hypothesis 404.

The hypothesis generating routine 304 is further configured to determine a third hypothesis profile 422 associated with the third hypothesis 406, in the manner described above.

Referring back to FIG. 3, once the hypothesis profile (i.e. the first hypothesis profile 418, the second hypothesis profile 420, and the third hypothesis profile 422) for each hypothesis (the first hypothesis 402, the second hypothesis 404, and the third hypothesis 406) has been determined, the hypothesis generating routine 304 is configured to transmit a data packet 323 to the pairing routine 306.

Pairing Routine 306

The pairing routine 306 is configured to receive the data packet 323 from the hypothesis generating routine 304. The data packet 323 comprises each of the plurality of hypotheses 426 (the first hypothesis 402, the second hypothesis 404, and the third hypothesis 406) and their respective profiles (the first hypothesis profile 418, the second hypothesis profile 420, and the third hypothesis profile 422).

The pairing routine 306 is configured generate a set of paired hypothesis by pairing each of the plurality of hypotheses 426 included within the data packet 323 (i.e. the first hypothesis 402, the second hypothesis 404, and the third hypothesis 406), with a remaining one of the plurality of hypotheses.

For example, given that there are three hypotheses, the pairing routine 306 is configured to generate three paired hypotheses, as follows:
1. first hypothesis 402—second hypothesis 404
2. first hypothesis 402—third hypothesis 406
3. second hypothesis 404—third hypothesis 406

The pairing routine 306 is further configured to execute a pairwise classifier 324, which is configured to assign a pair score to each of the paired hypotheses to generate a set of pair scores 606 (described in detail below).

Taking the first paired hypothesis as an example (the first hypothesis 402 paired with the second hypothesis 404), the pair score is indicative of a respective probability of (i) the first hypothesis 402 corresponding to a better textual representation of the utterance 314 than the second hypothesis 404, and (ii) the second hypothesis 404 corresponding to a better textual representation of the utterance 314 than the first hypothesis 402 (described in more detail below).

Pairwise Classifier 324—Training Phase

Figure 5:
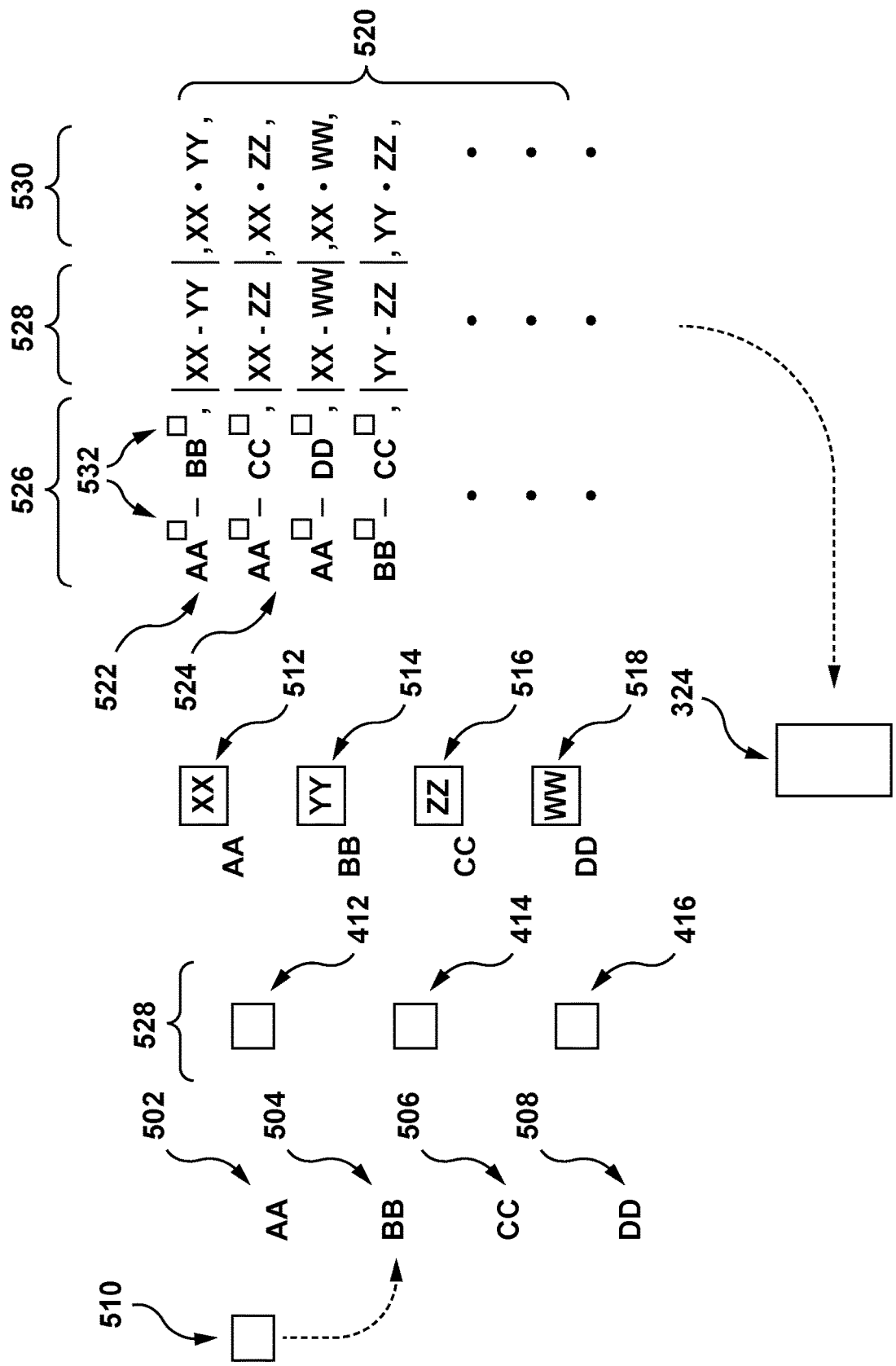
FIG. 5 depicts a schematic illustration of a process of training of a pairwise classifier, executed prior to the process of FIG. 3.

With reference to FIG. 5, a schematic illustration of a process of training of the pairwise classifier 324 is depicted.

For better understanding the underlying concepts of the present technology, it should be understood that the training of the pairwise classifier 324 can be broadly separated into a first phase and a second phase. In the first phase, the training input data (discussed below) is generated. In the second phase, the pairwise classifier 324 is trained using the training input data. Moreover, although the steps of training the pairwise classifier 324 are explained as being executed by the pairing routine 306, it is not limited as such.

In the first phase, one or more training hypotheses (a first training hypothesis 502, a second training hypothesis 504, a third training hypothesis 506 and a fourth training hypothesis 508) are generated in response to a training utterance 510. How the first training hypothesis 502, the second training hypothesis 504, the third training hypothesis 506 and the fourth training hypothesis 508 are generated is not limited, and may be generated in a similar manner as described above, by the hypothesis generating routine 304.

Although the first training hypothesis 502, the second training hypothesis 504, the third training hypothesis 506 and the fourth training hypothesis 508 is schematically illustrated as corresponding to a double letter ("AA", "BB", "CC", "DD"), it is done so for ease of understanding, and it should be understood that each of the first training hypothesis 502, the second training hypothesis 504, the third training hypothesis 506 and the fourth training hypothesis 508 corresponds to a word or a sequence of words.

Needless to say, although only four training hypotheses are illustrated, it is not limited as such. It is contemplated that more or less training hypotheses being generated in response to the training utterance 510.

Using the one or more context-specific models 410, a respective training hypothesis profile is generated for each of the one or more training hypotheses. For example, a first training hypothesis profile 512 is generated for the first training hypothesis 502, a second training hypothesis profile 514 is generated for the second training hypothesis 504, a third training hypothesis profile 516 is generated for the third training hypothesis 506, and a fourth training hypothesis profile 518 is generated for the fourth training hypothesis 508.

The pairwise classifier 324 is further configured to generate a set of training pair hypotheses 526. The set of training pair hypotheses 526 comprises the one or more training hypotheses (the first training hypothesis 502, the second training hypothesis 504, the third training hypothesis 506 and the fourth training hypothesis 508) paired with a remaining one of the one or more training hypothesis.

For example, the set of training pair hypotheses 526 comprises 6 training pair hypotheses, including a first training pair 522 (comprising the first training hypothesis 502 paired with the second training hypothesis 504) and a second training pair 524 (comprising the first training hypothesis 502 paired with the third training hypothesis 506), and so on.

For each of the training pairs included within the set of training pair hypotheses 526, the pairing routine 306 is configured to calculate a difference-in-profile score 528, an aggregated profile score 530; as well as to assign a label 532 to each training hypotheses included within a given training pair hypothesis.

The difference-in-profile score 528 represents a difference between the training set of vector values of the training hypotheses of a given training pair hypothesis. For example, the difference-in-profile score 528 of the first training pair 522 is indicative of the difference between the first training hypothesis profile 512 and the second training hypothesis profile 514 (both implemented as training set of vector values).

The aggregated profile score 530 can be calculated as a product of the training set of vector values of the training hypotheses of a given training pair hypothesis. For example, the aggregated profile score 530 of the first training pair 522 is determined by multiplying the first training hypothesis profile 512 and the second training hypothesis profile 514 (both implemented as training set of vector values).

Moreover, each of the training hypotheses included within a given training pair hypothesis is assigned with a label 532. The label 532 is indicative of the correct textual representation of the training utterance 510 and may be manually inputted by an administrator supervising the training of the pairwise classifier 324. For example, assuming that the correct textual representation of the training utterance 510 corresponds to the first training hypothesis 502, the first training hypothesis 502 is assigned with the label 532 having a label value of "1" and all the remaining training hypotheses is assigned with the label 532 having a label value of "0".

The training input data 520 is transmitted to the pairwise classifier 324 for training. In some non-limiting embodiments of the present technology, the pairwise classifier 324 is a Price, Kner, Personnaz, and Dreyfus (PKPD) algorithm. The pairwise classifier 324 comprises a training logic to determine a set of features associated with the training input data 520. Based on the set of features associated with the training input data 520, the pairwise classifier 324 is configured to learn to predict a training pair score for each of the paired training hypotheses, that is indicative of a respective probability of each training hypothesis corresponding to a better correct representation of the training utterance 510 than the training hypothesis it is paired with.

For example, with regards to the first training pair 522, the pairwise classifier 324 is trained to generate a first training score that is indicative of (i) a probability of the first training hypothesis 502 corresponding to a better textual representation of the training utterance 510 than the second training hypothesis 504; and (ii) a probability of the second training hypothesis 504 corresponding to a better textual representation of the training utterance 510 than the first training hypothesis 502.

Needless to say, although there is only depicted a single instance of the training of the pairwise classifier 324, it is done so for ease of illustration. It should be expressly understood that the training of the pairwise classifier 324 is done iteratively using a plurality of different training utterances.

Pairwise Classifier 324—In-Use Phase

Returning to FIG. 3, the explanation on how a set of pair scores 606 (see FIG. 6) is determined is resumed.

The pairwise classifier 324 is configured to predict a respective pair score for each of the paired hypotheses, based on (i) the two paired hypotheses; (ii) the difference-in-profile score; and (iii) the aggregated profile score of each paired hypotheses.

Figure 6:
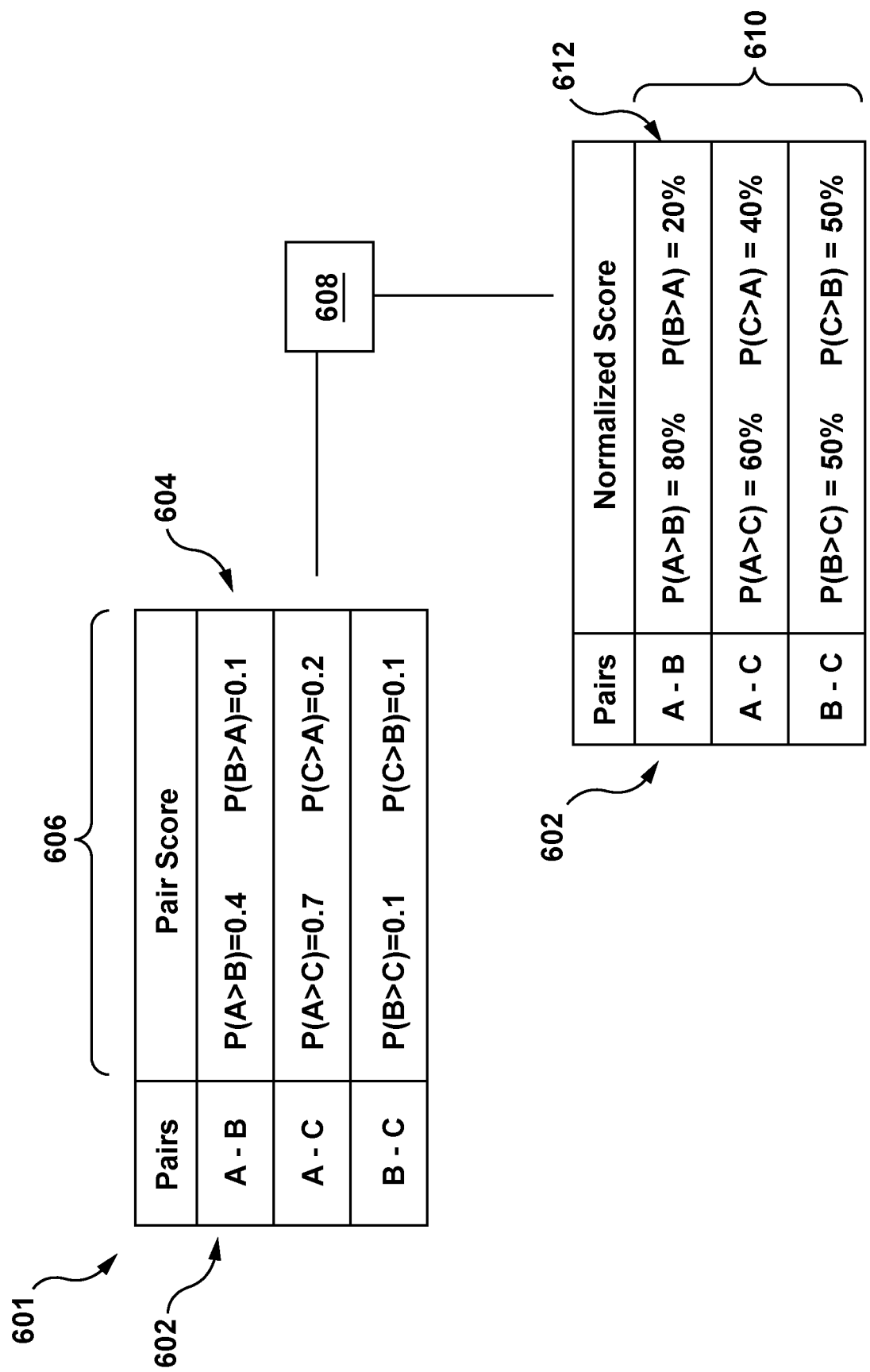
FIG. 6 depicts a schematic illustration of a process of determining the set of pair score scores and the set of normalized probability scores, executed as part of the process of FIG. 3.

With brief reference to FIG. 6, there is provided a non-limiting example of a table 601 storing the set of pair scores 606 being generated by the pairwise classifier 324. The set of pair scores 606 comprises a plurality of pair scores each being associated with a paired hypotheses.

Taking a first hypothesis pair 602 (which is the first hypothesis 402 paired with the second hypothesis 404), the pairwise classifier has generated a first pair score 604 that is indicative that (i) the probability of the first hypothesis 402 being a better textual representation of the utterance 314 is 0.4 (or 40%) than the second hypothesis 404, and (ii) the probability of the second hypothesis 404 being the better textual representation of the utterance 314 is 0.1 (or 10%) than the first hypothesis 402.

Needless to say, it should be understood that the values provided within the present example is for illustration purposes only, and it should be understood that the values are not meant to represent a specific situation and/or be consistent within the present disclosure.

Now, having determined the set of pair scores 606, the pairing routine 306 is configured to input the set of pair scores 606 into a normalizing algorithm 608 configured to normalize each pair score of the set of pair scores 606.

For example, the normalizing algorithm 608 may determine a set of normalized probability scores 610, each normalized probability score being associated with one of the pair of hypothesis of the set of paired hypothesis. Just as an illustration, the first pair score 604 is normalized into a first normalized probability score 612, such that the sum of the (i) probability of the first hypothesis 402 being a better textual representation of the utterance 314 than the second hypothesis 404, and the (ii) probability of the second hypothesis 404 being the better textual representation of the utterance 314 than the first hypothesis 402 equals to a pre-determined total score, which in this particular example corresponds to 100%.

Returning to FIG. 3, having determined the set of normalized probability scores 610, the pairwise classifier 324 is configured to transmit a data packet 326 to the ranking routine 310 (described in more detail below). The data packet 326 comprises the set of normalized probability scores 610.

Utterance Analysis Routine 308

The utterance analysis routine 308 has previously received the data packet 322 from the receiving routine 302. The data packet 322 comprises the device interaction history 318 and the user device ID 114.

The utterance analysis routine 308 is configured to execute the following functions.

First the utterance analysis routine 308 is configured to generate a set of utterance features. In some non-limiting embodiments of the present technology, the set of utterance features includes (i) user-specific features; and (ii) acoustic features. As it will be more apparent in the explanation below, the user-specific features comprise characteristics of the user 101, and the acoustic features comprises acoustic characteristics of the utterance 314.

In some non-limiting embodiments of the present technology, the user-specific features are generated based on the aggregated user profile stored within the database 128. As such, the utterance analysis routine 308 is configured to access the database 128 and retrieve the first aggregated user profile 214 associated with the user device ID 114. In some non-limiting embodiments of the present technology, the user-specific features comprise at least one of: (i) the age of the user 101; (ii) the gender of the user 101; and (iii) an interest profile of the user 101 determined based on the activities of the user 101 with the first service application 201 and the second service application 209.

In some non-limiting embodiments of the present technology, once the first aggregated user profile 214 has been retrieved, the utterance analysis routine 308 is configured to update the interest profile of the user 101 with the device interaction history 318. More precisely, depending on the recent interaction of the user 101 with the electronic device 102, the utterance analysis routine 308 is configured to augment the interest profile of the user 101. For example, if the user 101 has recently been listening to a particular genre of music, the interest profile of the user 101 is altered to reflect the interest of the user 101 to that particular genre of music.

The utterance analysis routine 308 is further configured to analyse the utterance 314 to generate acoustic features associated with the utterance 314. For example, the acoustic features may include at least one of: a tone of the utterance 314, a pitch of the utterance 314, and a noise-to-signal ratio of the utterance 314.

Ranking Routine 310

After the utterance analysis routine 308 has generated the set of utterance features, the utterance analysis routine 308 is configured to transmit a data packet 328 to the ranking routine 310. The data packet 328 comprises the set of utterance features.

Moreover, the ranking routine 310 has also previously received the data packet 326 from the pairing routine 306, which comprises the set of normalized probability scores 610.

The ranking routine 310 may execute the following functions.

The ranking routine 310 is configured to execute a machine learning algorithm (MLA) 330 trained to generate a ranking score to each of the plurality of hypotheses 426 (the first hypothesis 402, the second hypothesis 404, and the third hypothesis 406), based on (i) the set of utterance features included within the data packet 328 and (ii) the set of normalized probability scores 610 included within the data packet 326.

The manner in which the ranking score is implemented is not limited, and may for example be representative of a probability of a given one of the plurality of hypotheses 426 (the first hypothesis 402, the second hypothesis 404, and the third hypothesis 406) corresponding to the textual representation of the utterance 314. In some non-limiting embodiments of the present technology, the MLA 330 is configured to determine an absolute probability score of each of the plurality of hypotheses 426 corresponding to the textual representation of the utterance 314. In some non-limiting embodiments of the present technology, the ranking score may be expressed as a percentage value (from 0% to 100%) or on a scale (from 1 to 10). Needless to say, the ranking score may be expressed in a number of different formats.

How the MLA 330 is trained is not limited, and may for example, be trained using a set of training normalized probability scores derived from the training pair scores of the set of training pair hypotheses 526 (see FIG. 5) and a set of training utterance features associated with the training utterance 510. In some non-limiting embodiments of the present technology, the MLA 330 is a neural network.

As it would now be more apparent, the use of the set of utterance features as an input data to the MLA 330 is based on the appreciation made by the developers that by providing features indicative of user characteristics (such as age, gender, location, interests and the like), the MLA 330 is trained to take into account more features to accurately rank the plurality of hypotheses, compared to the prior art. Moreover, it is further assumed by the developers that by using the acoustic features associated with the utterance 314, the MLA is trained to properly distinguish the ambient sound and the utterance 314 itself, and properly rank the plurality of hypotheses while taking into account the tone and pitch of the utterance 314.

In some non-limiting embodiments of the present technology, the MLA 330 is configured to generate the ranking score based on the set of normalized probability scores 610 without the set of utterance features. Indeed, in developing the present technology, the developers observed that by inputting solely the set of normalized probability scores 610 into the MLA 330, the MLA 330 is configured to generate the ranking scores by taking into account the entirety of the plurality of normalized probability scores included within the set of normalized probability scores 610. As such, in some alternative non-limiting embodiments of the present technology, the data packet 312 does not comprise the user device ID 114 or the device interaction history 318, and the MLA 330 is configured to generate a ranking score for each of the plurality of hypotheses 426 based on the set of normalized probability scores 610, determined by the pairing routine 306.

Having determined the ranking scores to each of the plurality of hypotheses 426 (the first hypothesis 402, the second hypothesis 404, and the third hypothesis 406), the ranking routine 310 is configured to transmit a data packet 332 to the virtual assistant application 108 (see FIG. 1). The data packet 332 comprises the hypothesis that has been assigned the highest ranking score.

Let us assume that the first hypothesis 402 is associated with a highest ranking score, meaning that the first hypothesis 402 is the most likely hypothesis corresponding to the textual representation of the utterance 314.

In response to receiving the data packet 332, the virtual assistant application 108 is configured to execute a command associated with the first hypothesis 402. For example, if the first hypothesis 402 corresponds to "Play Korn", the virtual assistant application 108 is configured to access a music application (such as Spotify™) installed within the electronic device 102 and play the corresponding music.

Although the above explanation of the ASR application 126 has been made as being executed by the server 120, it is not limited as such. In some non-limiting embodiments of the present technology, it is contemplated that the ASR application 126 be executed within the electronic device 102. In such embodiments, the electronic device 102 would be communicatively coupled with the database 128.

Figure 7:
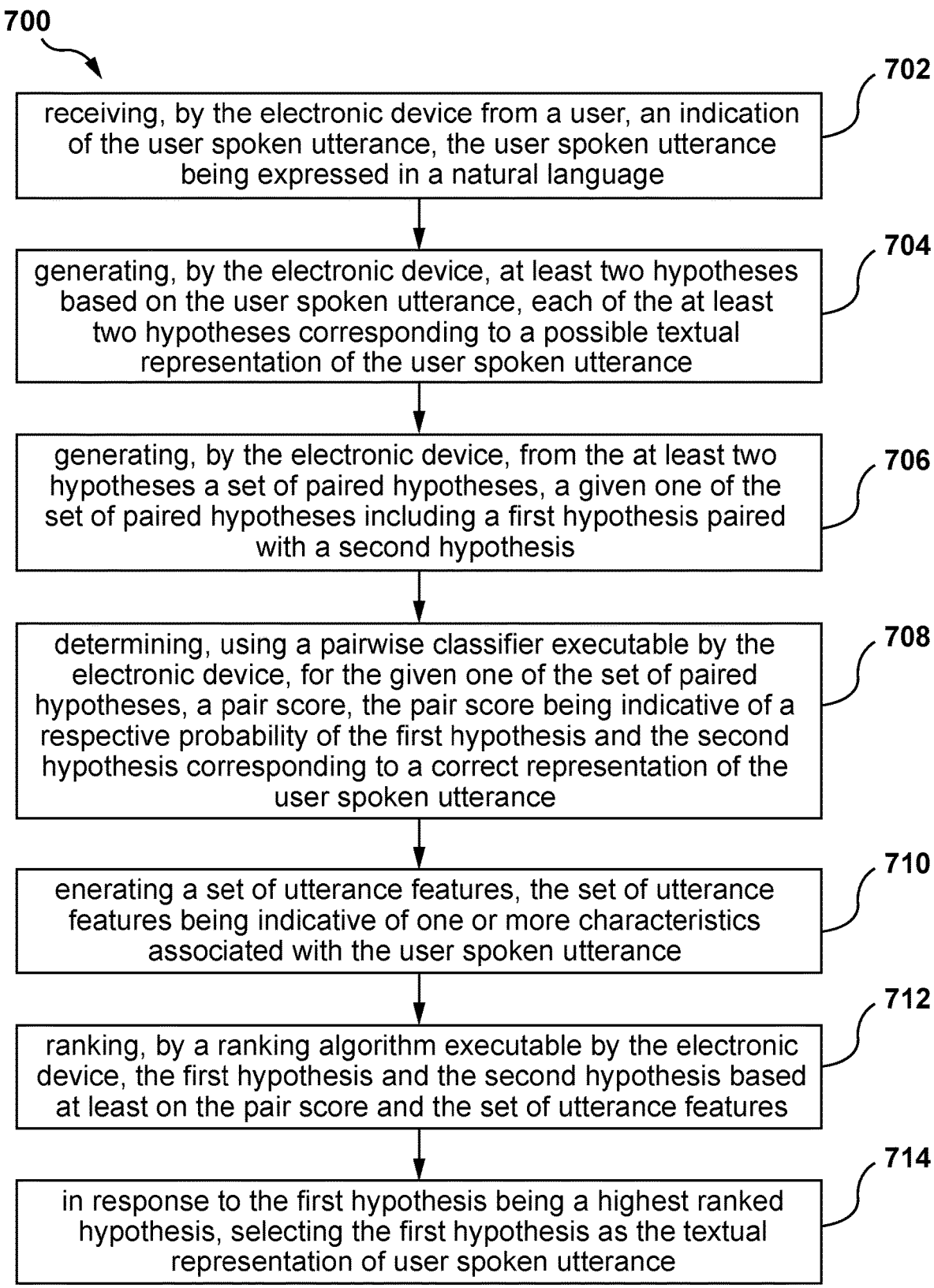
FIG. 7 depicts a block diagram of a flow chart of a method for generating a textual representation of a user-spoken utterance.

Given the architecture and examples provided herein above, it is possible to execute a computer-implemented method for generating a textual representation of a user-spoken utterance. With reference to FIG. 7, there is provided a flow chart of a method 700, the method 700 being executable in accordance with non-limiting embodiments of the present technology. The method 700 can be executed by the server 120 or by the electronic device 102.

Step 702: Receiving, By the Electronic Device From a User, an Indication of the User Spoken Utterance, the User Spoken Utterance Being Expressed in a Natural Language The method 700 starts at step 702, where the receiving routine 302 acquires the data packet 312 from the virtual assistant application 108 (see FIG. 1). For example, the data packet 312 comprises an utterance 314 of the user 101, as well as the user device ID 114.

The manner in which the data packet 312 is transmitted by the virtual assistant application 108 is not limited, and may for example be in response to the user 101 uttering a command to the virtual assistant application 108. In other words, the virtual assistant application 108 cam be in an "always listen" mode or can "wake up" in response to a pre-determined user spoken utterance.

In some non-limiting embodiments of the present technology, the data packet 312 further comprises the device interaction history 318.

In response to receive the data packet 312, the receiving routine 302 is configured to transmit the data packet 320 to the hypothesis generating routine 304. The data packet 320 comprises the utterance 314.

Moreover, the receiving routine 302 is further configured to transmit the data packet 322 to the utterance analysis routine 308. The data packet 322 comprises the user device ID 114 and the device interaction history 318.

Step 704: Generating, By the Electronic Device, at Least Two Hypotheses Based on the User Spoken Utterance, Each of the at Least Two Hypotheses Corresponding to a Possible Textual Representation of the User Spoken Utterance At step 704, in response to receiving the data packet 320, the hypothesis generating routine 304 is configured to generate plurality of hypotheses 426 (see FIG. 4) that correspond to a textual representation of the utterance 314.

How the plurality of hypotheses 426 are generated is not limited, and may for example be generated using the speech-to-text application 305.

In some non-limiting embodiments of the present technology, once the plurality of hypotheses 426 have been generated, the hypothesis generating routine 304 is further configured to determine the hypothesis profile for each of the plurality of hypotheses 426 using one or more context-specific models 410 (see FIG. 4).

Once the hypothesis profile (i.e. the first hypothesis profile 418, the second hypothesis profile 420, the third hypothesis profile 422) for each hypothesis (the first hypothesis 402, the second hypothesis 404, and the third hypothesis 406) has been determined, the hypothesis generating routine 304 is configured to transmit the data packet 323 to the pairing routine 306.

Step 706: Generating, By the Electronic Device, From the at Least Two Hypotheses a Set of Paired Hypotheses, a Given One of the Set of Paired Hypotheses Including a First Hypothesis Paired With a Second Hypothesis At step 706, the pairing routine 306 is configured to receive the data packet 323 from the hypothesis generating routine 304. The data packet 323 comprises each of the plurality of hypotheses 426 (the first hypothesis 402, the second hypothesis 404, and the third hypothesis 406) and their respective profiles (the first hypothesis profile 418, the second hypothesis profile 420, and the third hypothesis profile 422).

The pairing routine 306 is configured generate a set of paired hypothesis by pairing each of the plurality of hypotheses 426 included within the data packet 323 (i.e. the first hypothesis 402, the second hypothesis 404, and the third hypothesis 406), with a remaining one of the plurality of hypotheses.

For example, given that there are three hypotheses, the pairing routine 306 is configured to generate three paired hypotheses, as follows:
1. first hypothesis 402—second hypothesis 404
2. first hypothesis 402—third hypothesis 406
3. second hypothesis 404—third hypothesis 406

Step 708: Determining, Using a Pairwise Classifier Executable By the Electronic Device, for the Given One of the Set of Paired Hypotheses, a Pair Score, the Pair Score Being Indicative of a Respective Probability of the First Hypothesis and the Second Hypothesis Corresponding to a Correct Representation of the User Spoken Utterance At step 708, the pairing routine 306 is configured to execute a pairwise classifier 324, which is configured to assign a pair score to each of the paired hypotheses to generate a set of pair scores. Taking the first paired hypothesis as an example (the first hypothesis 402 paired with the second hypothesis 404), the pair score is indicative of a respective probability of (i) the first hypothesis 402 corresponding to a better textual representation of the utterance 314 than the second hypothesis 404, and (ii) the second hypothesis 404 corresponding to a better textual representation of the utterance 314 than the first hypothesis 402.

The pairwise classifier 324 is configured to assign a respective pair score to each of the paired hypotheses, based on (i) the two paired hypotheses of each paired hypotheses; (ii) the difference-in-profile score; and (iii) the aggregated profile score of each paired hypotheses.

Having determined the set of pair scores 606, the pairwise classifier 324 is further configured to input the set of pair scores 606 into the normalizing algorithm 608, which is configured to calculate the normalized probability scores 610, where each normalized probability score is associated with one of the pair of hypothesis of the set of paired hypothesis.

Having determined the set of normalized probability scores 610, the pairwise classifier 324 is configured to transmit a data packet 326 to the ranking routine 310 (described in more detail below). The data packet 326 comprises the set of normalized probability scores 610.

Step 710: Generating a Set of Utterance Features, the Set of Utterance Features Being Indicative of One or More Characteristics Associated With the User Spoken Utterance At step 710, the utterance analysis routine 308 is configured to receive the data packet 322 from the receiving routine 302. The data packet 322 comprises the device interaction history 318 and the user device ID 114.

The utterance analysis routine 308 is configured to execute the following functions. First the utterance analysis routine 308 is configured to generate a set of utterance features. In some non-limiting embodiments of the present technology, the set of utterance features includes (i) user-specific features; and (ii) acoustic features.

The user-specific features are generated by accessing the database 128 and retrieving the first aggregated user profile 214 associated with the user device ID 114.

In some non-limiting embodiments of the present technology, the user-specific features are generated based on the aggregated user profile stored within the database 128. As such, the utterance analysis routine 308 is configured to access the database 128 and retrieving the aggregated user profile based on the user device ID 114 included within the data packet 322. In some non-limiting embodiments of the present technology, the user-specific features comprise at least one of: (i) the age of the user 101; (ii) the gender of the user 101; and (iii) the interest profile of the user 101.

In some non-limiting embodiments of the present technology, once the first aggregated user profile 214 has been retrieved, the utterance analysis routine 308 is configured to update the interest profile of the user 101 with the device interaction history 318. More precisely, depending on the recent interaction of the user 101 with the electronic device 102, the utterance analysis routine 308 is configured to augment the interest profile of the user 101.

The utterance analysis routine 308 is further configured to analyse the utterance 314 to generate acoustic features associated with the utterance 314. For example, the acoustic features may include at least one of: a tone of the utterance 314, a pitch of the utterance 314, and a noise-to-signal ratio of the utterance 314.

Step 712: Ranking, By a Ranking Algorithm Executable By the Electronic Device, the First Hypothesis and the Second Hypothesis Based at Least on the Pair Score and the Set of Utterance Features At step 712, after the utterance analysis routine 308 has generated the set of utterance features, the utterance analysis routine 308 is configured to transmit the data packet 328 to the ranking routine 310. The data packet 328 comprises the set of utterance features.

The ranking routine 310 may execute the following functions.

The ranking routine 310 is configured to execute the MLA 330 trained to generate the ranking score to each of the plurality of hypotheses 426 (the first hypothesis 402, the second hypothesis 404, and the third hypothesis 406, based on (i) the set of utterance features included within the data packet 328 and (ii) the set of normalized probability scores 610.

The manner in which the ranking score is implemented is not limited, and may for example be representative of a probability of a given one of the plurality of hypotheses 426 (the first hypothesis 402, the second hypothesis 404, and the third hypothesis 406) corresponding to the textual representation of the utterance 314. In some non-limiting embodiments of the present technology, the MLA 330 is configured to determine an absolute probability score of each of the plurality of hypotheses 426 corresponding to the textual representation of the utterance 314. In some non-limiting embodiments of the present technology, the ranking score may be expressed as a percentage value (from 0% to 100%) or on a scale (from 1 to 10). Needless to say, the ranking score may be expressed in a number of different formats.

Step 714: In Response to the First Hypothesis Being a Highest Ranked Hypothesis, Selecting the First Hypothesis as the Textual Representation of the User Spoken Utterance At step 714, the ranking routine 310 is configured to select the hypothesis with the highest ranking score as the correct textual representation of the utterance 314.

In some non-limiting embodiments of the present technology, the ranking routine 310 is configured to transmit the data packet 332 comprising the hypothesis with the highest ranking score to the virtual assistant application 108.

The method 700 can terminate or return to step 702 and await for another new utterance from the electronic device 102.

It should be apparent to those skilled in the art that at least some embodiments of the present technology aim to expand a range of technical solutions for addressing a particular technical problem encountered by the conventional ASR technology, namely determining the textual representation of a user spoken utterance.

It should be expressly understood that not all technical effects mentioned herein need to be enjoyed in each and every embodiment of the present technology. For example, embodiments of the present technology may be implemented without the user enjoying some of these technical effects, while other embodiments may be implemented with the user enjoying other technical effects or none at all.

Modifications and improvements to the above-described implementations of the present technology may become apparent to those skilled in the art. The foregoing description is intended to be exemplary rather than limiting. The scope of the present technology is therefore intended to be limited solely by the scope of the appended claims.

While the above-described implementations have been described and shown with reference to particular steps performed in a particular order, it will be understood that these steps may be combined, sub-divided, or reordered without departing from the teachings of the present technology. Accordingly, the order and grouping of the steps is not a limitation of the present technology.

We claim:

1. A computer-implemented method for generating a textual representation of a user spoken utterance, the method being executable by an electronic device, the method comprising:
   receiving, by the electronic device from a user, an indication of the user spoken utterance, the user spoken utterance being expressed in a natural language;
   generating, by the electronic device, at least two hypotheses based on the user spoken utterance, each of the at least two hypotheses corresponding to a possible textual representation of the user spoken utterance;
   generating, by the electronic device, from the at least two hypotheses a set of paired hypotheses, a given one of the set of paired hypotheses including a first hypothesis paired with a second hypothesis;
   generating a first hypothesis profile, the first hypothesis profile corresponding to a first set of vector values representing one or more context-specific characteristics of the first hypothesis;
   generating a second hypothesis profile, the second hypothesis profile corresponding to a second set of vector values representing one or more context-specific characteristics of the second hypothesis;
   determining, using a pairwise classifier executable by the electronic device, for the given one of the set of paired hypotheses, a pair score, the pair score being indicative of a respective probability of the first hypothesis and the second hypothesis corresponding to a correct representation of the user spoken utterance, wherein the generating the pair score comprises:
      generating the pair score based at least on the first hypothesis profile and the second hypothesis profile; and wherein
      the pairwise classifier is a Price, Kner, Personnaz and Dreyfus (PKPD) algorithm previously trained using a training set of data prior to the receiving the user spoken utterance, the training set of data comprising at least:
         a training pair of hypothesis including a first training hypothesis paired with a second training hypothesis, each of the first training hypothesis and the second training hypothesis having been generated in response to a training utterance;
         a first training hypothesis profile, the first training hypothesis profile corresponding to a first training set of vector values representing one or more context-specific features of the first training hypothesis;
         a second training hypothesis profile, the second training hypothesis profile corresponding to a second training set of vector values representing one or more context-specific features of the second training hypothesis;
         a difference-in-profile score, the difference-in-profile score corresponding to a difference between the first training set of vector values and the second training set of vector values;
         an aggregated profile score, the aggregated profile score corresponding to a quotient of the first training set of vector values and the second training set of vector values; and
         a label indicative of one of the first training hypothesis and the second training hypothesis corresponding to the training utterance;
   generating a set of utterance features, the set of utterance features being indicative of one or more characteristics associated with the user spoken utterance;
   ranking, by a ranking algorithm executable by the electronic device, the first hypothesis and the second hypothesis based at least on the pair score and the set of utterance features; and
   in response to the first hypothesis being a highest ranked hypothesis, selecting the first hypothesis as the textual representation of the user spoken utterance.

2. The method of claim 1, wherein
   the at least two hypotheses include the first hypothesis, the second hypothesis and at least one additional hypothesis;
   the set of paired hypotheses includes a plurality of paired hypotheses comprising each of the at least two hypotheses paired with each of a remaining one of the at least two hypotheses; and wherein
   determining the pair score comprises:
      determining, a set of paired scores comprising one or more paired scores associated with each of the plurality of paired hypothesis.

3. The method of claim 2, wherein
   the ranking by the ranking algorithm comprises ranking the at least two hypotheses based at least on an entirety of the set of paired scores and the set of utterance features.

4. The method of claim 1, wherein determining the pair score includes:
   determining a first score, the first score being indicative of a relative probability of the first hypothesis corresponding to the correct representation of the user spoken utterance than the second hypothesis;
   determining a second score, the second score being indicative of the relative probability of the second hypothesis corresponding to the correct representation of the user spoken utterance than the first hypothesis;
   determining a first normalized score and a second normalized score;
   the first normalized score being based on the first score;
   the second normalized score being based on the second score; and
   such that the first normalized score and the second normalized score add up together to a pre-determined total score.

5. The method of claim 1, wherein generating the first hypothesis profile comprises:
- analyzing, the first hypothesis using one or more context-specific models, each of the one or more context-specific models being trained on a plurality of context-specific words;
- assigning, by each of the one or more context-specific models, a respective context-specific score corresponding to a vector value, a given vector value representing a proportion of context-specific words associated with a given context-specific model within the first hypothesis; and
- aggregating the one or more vector values assigned by each of the one or more context-specific models.

6. The method of claim 1, wherein the set of utterance features includes user-specific features, the user-specific features comprising at least one of:
- an age of the user;
- a gender of the user; and
- an interest profile of the user.

7. The method of claim 6, wherein the electronic device is further communicatively coupled to a database comprising one of a browsing log and a search log associated with the user, and wherein the user-specific features are generated based on at least one of:
- a browsing history associated with the user; and
- a search history associated with the user.

8. The method of claim 6, wherein the electronic device is a user device, and wherein the user-specific features are generated based on previous interactions of the user with the user device.

9. The method of claim 1, wherein the set of utterance features includes acoustic features, the acoustic features comprising at least one of:
- a tone of the user spoken utterance;
- a pitch of the user spoken utterance; and
- a noise-to-signal ratio.

10. The method of claim 1, wherein
the electronic device is a server; wherein
the server is coupled to a user device associated with the user; and wherein
receiving the user spoken utterance from the user comprises receiving the user spoken utterance from the user device.

11. The method of claim 1, wherein
the ranking algorithm is a neural network; and
the method further comprises training the neural network using a training set of data prior to receiving the natural language input.

12. A computer-implemented method for generating a textual representation of a user spoken utterance, the method being executable by an electronic device, the method comprising:
- receiving, by the electronic device from a user, an indication of the user spoken utterance, the user spoken utterance being expressed in a natural language;
- generating, by the electronic device, at least two hypotheses based on the user spoken utterance, each of the at least two hypotheses corresponding to a possible textual representation of the user spoken utterance;
- generating, by the electronic device, a set of paired hypotheses, the set of paired hypotheses comprising (i) each given one of the at least two hypotheses paired with (ii) each of a remaining one of the at least two hypotheses;
- determining, using a pairwise classifier executable by the electronic device, a set of pair scores, the set of pair scores including a pair score for each of the paired hypothesis within the set of paired hypotheses, a given pair score for a given paired hypothesis being indicative of a respective probability of a first hypothesis and a second hypothesis of the given paired hypothesis corresponding to a correct representation of the user spoken utterance, wherein the pairwise classifier is a Price, Kner, Personnaz and Dreyfus (PKPD) algorithm;
- ranking the at least two hypotheses by a ranking algorithm executable by the electronic device, the ranking algorithm being configured to rank the at least two hypotheses based on an entirety of the set of pair scores;
- in response to the first hypothesis being a highest ranked hypothesis, selecting the first hypothesis as the textual representation of the user spoken utterance.

13. A system for generating a textual representation of a user spoken utterance, the system comprising an electronic device, the electronic device comprising a processor configured to:
- receive, by the electronic device from a user, an indication of the user spoken utterance, the user spoken utterance being expressed in a natural language;
- generate, by the electronic device, at least two hypotheses based on the user spoken utterance, each of the at least two hypotheses corresponding to a possible textual representation of the user spoken utterance;
- generate, by the electronic device, from the at least two hypotheses a set of paired hypotheses, a given one of the set of paired hypotheses including a first hypothesis paired with a second hypothesis;
- generate a first hypothesis profile, the first hypothesis profile corresponding to a first set of vector values representing one or more context-specific characteristics of the first hypothesis;
- generate a second hypothesis profile, the second hypothesis profile corresponding to a second set of vector values representing one or more context-specific characteristics of the second hypothesis;
- determine, using a pairwise classifier executable by the electronic device, a set of pair scores, the set of pair scores including comprising a pair score associated with the given one of the set of paired hypotheses, the pair score being indicative of a respective probability of the first hypothesis and the second hypothesis corresponding to a correct representation of the user spoken utterance, wherein to generate the pair score the processor is configured to:
  - generate the pair score based at least on the first hypothesis profile and the second hypothesis profile; and wherein
  - the pairwise classifier is a Price, Kner, Personnaz and Dreyfus (PKPD) algorithm previously trained using a training set of data prior to the receiving the user spoken utterance, the training set of data comprising at least:
    - a training pair of hypothesis including a first training hypothesis paired with a second training hypothesis, each of the first training hypothesis and the second training hypothesis having been generated in response to a training utterance;
    - a first training hypothesis profile, the first training hypothesis profile corresponding to a first training set of vector values representing one or more context-specific features of the first training hypothesis;
    - a second training hypothesis profile, the second training hypothesis profile corresponding to a second training set of vector values representing one or more context-specific features of the second training hypothesis;

a difference-in-profile score, the difference-in-profile score corresponding to a difference between the first training set of vector values and the second training set of vector values;

an aggregated profile score, the aggregated profile score corresponding to a quotient of the first training set of vector values and the second training set of vector values; and a label indicative of one of the first training hypothesis and the second training hypothesis corresponding to the training utterance;

generate a set of utterance features, the set of utterance features being indicative of one or more characteristics associated with the user spoken utterance;

rank, by a ranking algorithm executable by the electronic device, the first hypothesis and the second hypothesis based at least on the entirety of the set of pair scores and the set of utterance features; and in response to the first hypothesis being a highest ranked hypothesis, select the first hypothesis as the textual representation of the user spoken utterance.

14. The system of claim 13, wherein the at least two hypotheses include the first hypothesis, the second hypothesis and at least one additional hypothesis;

the set of paired hypotheses includes a plurality of paired hypotheses comprising each of the at least two hypotheses paired with each of a remaining one of the at least two hypotheses; and wherein to determine the pair score, the processor is configured to:
determine, a set of paired scores comprising one or more paired scores associated with each of the plurality of paired hypothesis.

15. The system of claim 13, wherein to determine the pair score, the processor is configured to:
determine a first score, the first score being indicative of a relative probability of the first hypothesis corresponding to the correct representation of the user spoken utterance than the second hypothesis;
determine a second score, the second score being indicative of the relative probability of the second hypothesis corresponding to the correct representation of the user spoken utterance than the first hypothesis;
determine a first normalized score and a second normalized score;
the first normalized score being based on the first score;
the second normalized score being based on the second score; and
such that the first normalized score and the second normalized score add up together to a pre-determined total score.

16. The system of claim 13, wherein the set of utterance features includes user-specific features, the user-specific features comprising at least one of:
an age of the user;
a gender of the user; and
an interest profile of the user.

17. The system of claim 13, wherein the set of utterance features includes acoustic features, the acoustic features comprising at least one of:
a tone of the user spoken utterance;
a pitch of the user spoken utterance; and
a noise-to-signal ratio.

18. The system of claim 13, wherein
the ranking algorithm is a neural network; and
the processor is further configured to train the neural network using a training set of data prior to receiving the natural language input.

* * * * *